United States Patent
Xu et al.

(10) Patent No.: US 11,780,215 B2
(45) Date of Patent: Oct. 10, 2023

(54) COMPOSITE ARTICLES INCLUDING SURFACE LAYERS THAT PROVIDE ENHANCED FORMABILITY

(71) Applicants: Hong Xu, Lynchburg, VA (US); Peter T Evers, Jr., Byron, MI (US); Mark O Mason, Covington, VA (US); Ziniu Yu, Forest, VA (US)

(72) Inventors: Hong Xu, Lynchburg, VA (US); Peter T Evers, Jr., Byron, MI (US); Mark O Mason, Covington, VA (US); Ziniu Yu, Forest, VA (US)

(73) Assignee: Hanwha Azdel, Inc., Forest, VA (US)

( * ) Notice: Subject to any disclaimer, the term of this patent is extended or adjusted under 35 U.S.C. 154(b) by 180 days.

(21) Appl. No.: 15/838,126

(22) Filed: Dec. 11, 2017

(65) Prior Publication Data

US 2018/0162107 A1 Jun. 14, 2018

Related U.S. Application Data

(60) Provisional application No. 62/537,296, filed on Jul. 26, 2017, provisional application No. 62/433,154, filed on Dec. 12, 2016.

(51) Int. Cl.
*B32B 27/12* (2006.01)
*B32B 27/32* (2006.01)
(Continued)

(52) U.S. Cl.
CPC ............ *B32B 27/12* (2013.01); *B32B 5/022* (2013.01); *B32B 5/024* (2013.01); *B32B 5/028* (2013.01); *B32B 5/08* (2013.01); *B32B 27/28* (2013.01); *B32B 27/285* (2013.01); *B32B 27/286* (2013.01); *B32B 27/302* (2013.01); *B32B 27/304* (2013.01); *B32B 27/32* (2013.01);
(Continued)

(58) Field of Classification Search
CPC .......... B32B 27/12; B32B 5/022; B32B 5/024
See application file for complete search history.

(56) References Cited

U.S. PATENT DOCUMENTS 6,383,649 B2    5/2002   Sugimoto
7,682,697 B2    3/2010   Azdel
(Continued)

FOREIGN PATENT DOCUMENTS

JP    02041156 A    *   2/1990
JP    H02-041156         2/1990
(Continued)

OTHER PUBLICATIONS

Derwent Abstract of JP 2-41156.*
(Continued)

*Primary Examiner* — Hai Vo
(74) *Attorney, Agent, or Firm* — Rhodes IP PLC; Christopher R. Rhodes

(57) ABSTRACT

Prepregs, composites and articles are described that comprise a porous core layer and a surface layer comprising bi-component fibers which can enhance formability of the article without breakthrough. The enhanced formability can permit forming or drawing of the article to increased depths without breakthrough. Interior and exterior automotive components including the articles are described.

17 Claims, 8 Drawing Sheets

(51) Int. Cl.
   *B32B 5/02*     (2006.01)
   *B32B 5/08*     (2006.01)
   *B32B 27/30*    (2006.01)
   *B32B 27/28*    (2006.01)
   *D21H 13/20*    (2006.01)
   *B32B 27/34*    (2006.01)
   *B32B 27/36*    (2006.01)

(52) U.S. Cl.
   CPC .............. *B32B 27/34* (2013.01); *B32B 27/36* (2013.01); *B32B 27/365* (2013.01); *D21H 13/20* (2013.01); *B32B 5/02* (2013.01); *B32B 2255/10* (2013.01); *B32B 2255/20* (2013.01); *B32B 2255/24* (2013.01); *B32B 2255/26* (2013.01); *B32B 2262/0253* (2013.01); *B32B 2262/0269* (2013.01); *B32B 2262/0276* (2013.01); *B32B 2262/10* (2013.01); *B32B 2262/101* (2013.01); *B32B 2262/103* (2013.01); *B32B 2262/106* (2013.01); *B32B 2262/12* (2013.01); *B32B 2305/026* (2013.01); *B32B 2305/08* (2013.01); *B32B 2307/718* (2013.01); *B32B 2605/003* (2013.01)

(56) References Cited

U.S. PATENT DOCUMENTS

| | | | |
|---|---|---|---|
| 8,497,175 B2 | 7/2013 | Araki | |
| 8,721,943 B2 | 5/2014 | Moore | |
| 8,834,759 B2 | 9/2014 | Lalouch | |
| 2007/0176155 A1 | 8/2007 | Granada | |
| 2008/0057283 A1* | 3/2008 | Blinkhorn | D04H 1/485 |
| | | | 428/292.1 |
| 2011/0020645 A1 | 1/2011 | Nakanishi | |
| 2012/0232211 A1 | 9/2012 | Vos | |
| 2013/0292076 A1* | 11/2013 | Raghavendran | B32B 5/28 |
| | | | 162/145 |
| 2014/0162020 A1 | 6/2014 | Wang | |
| 2016/0082376 A1 | 3/2016 | Choi | |
| 2016/0332675 A1 | 11/2016 | Yang | |
| 2017/0034549 A1 | 2/2017 | Good | |
| 2020/0283592 A1 | 9/2020 | Wang | |
| 2020/0290310 A1 | 9/2020 | Wang | |

FOREIGN PATENT DOCUMENTS

| | | |
|---|---|---|
| JP | 2012701350 A | 6/2012 |
| KR | 10-2007-0114042 | 11/2007 |

OTHER PUBLICATIONS

Translation of JP 02041156, Tadashi Saeki, Feb. 9, 1990, p. 1-4. (Year: 1990).*
ISR/WO for PCT/US17/65638 dated Apr. 23, 2018.
EP Search Report for EP17881090 dated May 29, 2020.

* cited by examiner

COMPOSITE ARTICLES INCLUDING SURFACE LAYERS THAT PROVIDE ENHANCED FORMABILITY

PRIORITY APPLICATION

This application is related to, and claims priority to and the benefit of, U.S. Provisional Application No. 62/433,154 filed on Dec. 12, 2016 and to U.S. Provisional Application No. 62/537,296 filed on Jul. 26 2017, the entire disclosure of each of which is incorporated herein by reference for all purposes.

TECHNOLOGICAL FIELD

This application is related to thermoplastic composite articles which have improved formability. More particularly, certain configurations are described below of composite articles that provide enhanced formability to permit deep drawing of the composite articles.

BACKGROUND

Articles for automotive and construction materials applications typically are designed to meet a number of competing and stringent performance specifications. In many instances, forming of articles may result in breakthrough at one or more areas that are formed.

SUMMARY

Certain configurations of the prepregs, cores and composite articles described herein provide desirable attributes including, but not limited to, lightweight materials which can include one or more surface layers comprising bi-component fibers, e.g., fiber based scrims comprising bi-component fibers, which can provide enhanced formability to the composite articles, e.g., deter or prevent breakthrough in forming processes.

In an aspect, a composite article comprises a thermoplastic fiber-reinforced porous core layer and a surface layer. For example, the porous core layer may comprise a web formed from a plurality of reinforcing fibers and a thermoplastic material. The surface layer may comprise a plurality of bi-component fibers, e.g., a plurality of sheath-core or shell-core fibers. The surface layer is typically coupled to the porous core layer at one or more surfaces of the porous core layer.

In certain examples, at least 95% of fibers in the surface layer are bi-component fibers, e.g., core-shell fibers, two component fibers, coated fibers, etc. In other examples, the bi-component fibers comprise fibers comprising a polyethylene sheath or fibers comprising a polypropylene sheath. In some examples, the bi-component fibers comprise polyester core fibers, e.g., polyethylene terephthalate core fibers with a polyethylene sheath or polyethylene terephthalate core fibers with a polypropylene sheath, or may comprise nylon core fibers with a polyethylene sheath or nylon core fibers with a polypropylene sheath. In some examples, the porous core layer comprises a flame retardant material, e.g., expandable graphite materials, magnesium hydroxide, aluminum hydroxide or combinations thereof.

In one aspect, a composite article comprises a thermoplastic fiber-reinforced porous core layer comprising a web formed from a plurality of reinforcing fibers and a thermoplastic material, and a surface layer, e.g., a non-woven scrim, coupled to the core layer at a first surface of the core layer, the surface layer, e.g., the non-woven scrim, comprising a plurality of sheath-core fibers where the sheath is a polyolefin, e.g., the article with the specified surface layer can provide enhanced formability without breakthrough when the article is subjected to a deep draw molding process.

In certain examples, at least 95% by weight of the fibers of the non-woven scrim are bi-component fibers. For example, 95% by weight of the fibers in the surface layer may comprise core fibers comprising a polyolefin sheath or another material as a sheath. In some examples, the fibers of the scrim comprise polyethylene sheath fibers or polypropylene sheath fibers. In certain embodiments, the scrim comprises polyester core fibers, e.g., polyethylene terephthalate core fibers. In other examples, the polyester fibers of the scrim comprise polyester core fibers comprising a polyethylene sheath or polyester terephthalate core fibers comprising a polypropylene sheath or combinations thereof. In some examples, the thermoplastic material of the core layer comprises one or more of polyethylene, polypropylene, polystyrene, acrylonitrylstyrene, butadiene, polyethyleneterephthalate, polybutyleneterephthalate, polybutylenetetrachlorate, polyvinyl chloride, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, a poly(1,4 phenylene) compound, a high heat polycarbonate, high temperature nylon, silicones, or blends of these materials with each other. In other instances, the reinforcing fibers of the core layer comprise one or more of glass fibers, aramid fibers, graphite fibers, carbon fibers, inorganic mineral fibers, metal fibers, metalized synthetic fibers, and metallized inorganic fibers, fibers or combinations thereof. In some examples, the article comprises a skin coupled to a second surface of the core layer. In certain instances, the skin is selected from the group consisting of a thermoplastic film, an elastomeric film, a frim (film+scrim), a scrim, a foil, a woven fabric, a non-woven fabric, a bi-component fiber scrim (e.g., a bi-component fiber scrim comprising sheath-core fibers) or be present as an inorganic coating, an organic coating, a thermoplastic coating or a thermoset coating. In some embodiments, the porous core further comprises a lofting agent. In some examples, a porosity of the porous core layer is at least 20%. In other examples, the thermoplastic material is present from about 20 weight percent to about 80 weight percent, and the reinforcing fibers are present from about 20 weight percent to about 80 weight percent based on the weight of the porous core layer. In certain embodiments, the thermoplastic material comprises a polyolefin, the reinforcing fibers comprise glass fibers, the lofting agent comprises microspheres and the surface layer comprises sheath-core fibers where the sheath material is a polyolefin and the core fibers are thermoplastic fibers or polyester fibers. In some examples, the article comprises at least one deep drawn area with a depth of at least 10 cm, at least 20 cm, at least 30 cm, or at least 40 cm. In some examples, the basis weight of the surface layer is at least 10 gsm or is between about 10 gsm to about 300 gsm or about 15 gsm to about 50 gsm. In other examples, the article comprises a decorative layer coupled to the article. In certain embodiments, the porous core layer comprises a basis weight of about 300 gsm to about 3500 gsm.

In another aspect, a fiber reinforced thermoplastic composite article comprises a thermoplastic fiber-reinforced porous core layer comprising a web formed from a plurality of reinforcing fibers and a thermoplastic material, and a surface layer coupled to the core layer at a first surface of the core layer, the surface layer comprising a plurality of bi-component thermoplastic fibers, e.g., bi-component thermoplastic fibers comprising fibers with sheath-core fibers where the sheath comprises a polyolefin, wherein the article comprises at least one deep drawn area with a depth of at least 1 cm (or 5 cm or 10 cm) without breakthrough at the at least one deep drawn area.

In certain examples, at least 95% by weight of the fibers of the surface layer comprise sheath-core fibers. In some embodiments, the thermoplastic fibers of the surface layer comprise polyethylene sheath fibers or polypropylene sheath fibers. In other examples, the surface layer comprises polyester core fibers, e.g., polyethylene terephthalate core fibers. In some embodiments, the polyester core fibers of the surface layer comprise a polyethylene sheath or a polypropylene sheath or combinations thereof. In certain examples, the thermoplastic material of the core layer comprises one or more of polyethylene, polypropylene, polystyrene, acrylonitrylstyrene, butadiene, polyethyleneterephthalate, polybutyleneterephthalate, polybutylenetetrachlorate, polyvinyl chloride, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, a poly(1,4 phenylene) compound, a high heat polycarbonate, high temperature nylon, silicones, or blends of these materials with each other. In other instances, the reinforcing fibers of the core layer comprise one or more of glass fibers, aramid fibers, graphite fibers, carbon fibers, inorganic mineral fibers, metal fibers, metalized synthetic fibers, and metallized inorganic fibers, fibers or combinations thereof. In some examples, the article comprises a skin coupled to a second surface of the core layer. In certain examples, the skin is selected from the group consisting of a thermoplastic film, an elastomeric film, a frim, a scrim, a foil, a woven fabric, a non-woven fabric, a sheath-core fiber scrim or be present as an inorganic coating, an organic coating, a thermoplastic coating or a thermoset coating. In some embodiments, the porous core further comprises a lofting agent. In further instances, a porosity of the porous core layer is at least 20%. In certain examples, the thermoplastic material is present from about 20 weight percent to about 80 weight percent, and the reinforcing fibers are present from about 20 weight percent to about 80 weight percent based on the weight of the porous core layer. In some embodiments, the thermoplastic material comprises a polyolefin, the reinforcing fibers comprise glass fibers, the lofting agent comprises microspheres and the surface layer comprises a scrim comprising sheath-core fibers wherein the sheath comprises a polyolefin and the core comprises thermoplastic fibers or polyester fibers. In certain examples, the article comprises at least one deep drawn area with a depth of at least 20 cm. In some examples, the article comprises at least one deep drawn area with a depth of at least 40 cm. In other examples, the article comprises at least one deep drawn area with a depth of at least 45 cm. In certain embodiments, the surface layer is a scrim comprising a basis weight of at least 10 gsm or is between about 10 gsm to about 300 gsm or about 15 gsm to about 50 gsm. In some examples, the scrim comprises a non-woven arrangement of sheath-core fibers where the sheath comprises a polyolefin and the core comprises thermoplastic fibers or polyester fibers, in which at least 95% by weight of the fibers are sheath-core fibers. In further examples, the article comprises a decorative layer coupled to the article. In certain embodiments, the porous core layer comprises a basis weight of about 300 gsm to about 3500 gsm.

In an additional aspect, a thermoplastic composite article comprises a thermoplastic fiber-reinforced porous core layer comprising a web formed from a plurality of reinforcing fibers and a thermoplastic material, and a surface layer coupled to the core layer at a first surface of the core layer, the surface layer comprising bi-component fibers such that the composite article has improved formability and can be subjected to a deep drawing forming process without breakthrough. For example, the surface layer can be selected for use in the composite article based on having increased elongation prior to coupling of the surface layer to the core layer In some instances, elongation of the surface layer may be at least 20% greater in a machine direction and in a cross direction as tested by ASTM test method 5304-09(2013) compared to a similar surface layer comprising only single component fibers, e.g., compared to a surface layer comprising single component fibers without a sheath.

In certain embodiments, at least 95% by weight of the fibers of the surface layer are bi-component fibers. For example, 95% by weight of the fibers in the surface layer may comprise a sheath-core fiber where the sheath comprises a polyolefin. In other embodiments, the bi-component fibers of the surface layer comprise polyethylene sheath fibers or polypropylene sheath fibers. In some examples, the surface layer comprises polyester core fibers. In certain instances, the polyester core fibers of the surface layer comprise a polyethylene sheath or a polypropylene sheath or combinations thereof. In some embodiments, the thermoplastic material of the core layer comprises one or more of polyethylene, polypropylene, polystyrene, acrylonitrylstyrene, butadiene, polyethyleneterephthalate, polybutyleneterephthalate, polybutylenetetrachlorate, polyvinyl chloride, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, a poly(1,4 phenylene) compound, a high heat polycarbonate, high temperature nylon, silicones, or blends of these materials with each other. In other embodiments, the reinforcing fibers of the core layer comprise one or more of glass fibers, aramid fibers, graphite fibers, carbon fibers, inorganic mineral fibers, metal fibers, metalized synthetic fibers, and metallized inorganic fibers, fibers or combinations thereof. In certain examples, the article comprises a skin coupled to a second surface of the core layer. In some embodiments, the skin is selected from the group consisting of a thermoplastic film, an elastomeric film, a frim, a scrim, a foil, a woven fabric, a non-woven fabric, a sheath-core fiber scrim or be present as an inorganic coating, an organic coating, a thermoplastic coating or a thermoset coating. In certain examples, the porous core further comprises a lofting agent. In some embodiments, a porosity of the porous core layer is at least 20%. In other examples, the thermoplastic material is present from about 20 weight percent to about 80 weight percent, and the reinforcing fibers are present from about 20 weight percent to about 80 weight percent based on the weight of the porous core layer. In certain instances, the thermoplastic material comprises a polyolefin, the reinforcing fibers comprise glass fibers, the lofting agent comprises microspheres and the surface layer comprises a scrim comprising sheath-core thermoplastic fibers. In other examples, the article comprises at least one deep drawn area with a depth of at least 20 cm, at least 30 cm, or at least 40 cm or at least 45 cm. In certain examples, the surface layer is a scrim comprising a basis weight of at least 10 gsm or is between about 10 gsm to about 300 gsm or about 15 gsm to about 50 gsm. In some embodiments, the scrim comprises a non-woven arrangement of thermoplastic core fibers with a polyolefin sheath, in which at least 95% of the thermoplastic core fibers comprise the polyolefin sheath. In certain embodiments, the article comprises a decorative layer coupled to the article. In certain examples, the porous core layer comprises a basis weight of about 300 gsm to about 3500 gsm.

In another aspect, a method of producing a thermoplastic composite article comprises disposing a surface layer comprising sheath-core thermoplastic fibers onto a thermoplastic fiber-reinforced porous core layer comprising a web formed from a plurality of reinforcing fibers and a thermoplastic material.

In some examples, the method comprises forming the porous core layer by combining the thermoplastic material and fibers to form an agitated aqueous foam, disposing the agitated aqueous foam onto a wire support, evacuating the water to form a web of the fibers held together by the thermoplastic material, heating the web to a first temperature at or above the melting temperature of the thermoplastic material, and compressing the web to a first thickness. In certain examples, the method comprises forming the surface layer by disposing a surface layer comprising a plurality of sheath-core fibers on the core layer. In some instances, the method comprises forming the surface layer by forming a non-woven scrim comprising the plurality of sheath-core fibers after disposing of the surface layer on the core layer. In other examples, the method comprises forming the surface layer by providing the aqueous foam to core fibers of the surface layer to dispose the foam onto the core fibers of the surface layer. In certain embodiments, the method comprises spraying the aqueous foam onto the core fibers of the surface layer. In some examples, the method comprises dipping the surface layer into the aqueous foam. In other examples, the method comprises heating the article to melt the sheath material of the surface layer. In certain instances, the method comprises subjecting the article to forming process to deep draw at least one area to a depth of 10 cm or more without breakthrough. In other examples, the method comprises coupling a decorative layer to the core layer.

In another aspect, a method of producing a thermoplastic composite article comprises combining the thermoplastic material and fibers to form an agitated aqueous foam, disposing the agitated aqueous foam onto a wire support, evacuating the water to form a web of the fibers held together by the thermoplastic material, heating the web to a first temperature at or above the melting temperature of the thermoplastic material, disposing a surface layer comprising sheath-core fibers on the heated web to provide the composite article, and compressing the composite article to a first thickness.

In certain embodiments, the method comprises selecting the thermoplastic material of the porous core layer to comprise a polyolefin. In other examples, the method comprises selecting the fibers to comprise one or more of glass fibers, aramid fibers, graphite fibers, carbon fibers, inorganic mineral fibers, metal fibers, metalized synthetic fibers, and metallized inorganic fibers, fibers or combinations thereof. In some examples, the method comprises forming the thermoplastic article to comprise at least one deep drawn area without breakthrough at the deep drawn area. In certain embodiments, the method comprises deep drawing the area to a depth of at least 1 cm without breakthrough at least 10 cm without breakthrough or at least 20 cm without breakthrough or at least 30 cm without breakthrough or at least 40 cm without breakthrough. As noted in more detail below, the exact draw depth achievable without breakthrough can be dependent, at least in part, on the span or diameter of the drawn areas. In some examples, the method comprises heating the composite article to melt or soften, at least to some degree, a sheath material of the sheath-core fibers of the surface layer to increase adhesion between the surface layer and the core layer. In other examples, the method comprises compressing the composite article after the sheath material of the sheath-core fibers is melted or softened, at least to some degree.

In another aspect, a method of producing a thermoplastic composite article comprises combining the thermoplastic material and fibers to form an agitated aqueous foam, disposing the agitated aqueous foam onto a wire support, evacuating the water to form a web of the fibers held together by the thermoplastic material, heating the web to a first temperature at or above the melting temperature of the thermoplastic material, compressing the article to a first thickness, and disposing a surface layer comprising sheath-core fibers onto the compressed web to provide a composite article.

In certain embodiments, the method comprises selecting the thermoplastic material of the porous core layer to comprise a polyolefin. In other examples, the method comprises selecting the fibers to comprise one or more of glass fibers, aramid fibers, graphite fibers, carbon fibers, inorganic mineral fibers, metal fibers, metalized synthetic fibers, and metallized inorganic fibers, fibers or combinations thereof. In some examples, the method comprises forming the thermoplastic article to comprise at least one deep drawn area without breakthrough at the deep drawn area. In certain examples, the method comprises deep drawing the area to a depth of at least 1 cm without breakthrough or at least 5 cm without breakthrough or at least 10 cm without breakthrough. In other examples, the method comprises deep drawing the area to a depth of at least 20 cm without breakthrough or least 30 cm without breakthrough or least 30 cm without breakthrough. In some examples, the method comprises heating the composite article to melt or soften, at least to some degree, a sheath material of the sheath-core fibers of the surface layer to increase adhesion between the surface layer and the core layer. In certain examples, the method comprises compressing the composite article after the sheath material of the sheath-core fibers is melted or softened, at least to some degree.

In another aspect, a thermoplastic article comprises a thermoplastic fiber-reinforced porous core layer comprising a web formed from a plurality of reinforcing fibers and a thermoplastic material, and a non-woven scrim coupled to the core layer at a first surface of the core layer, the non-woven scrim comprising a plurality of bi-component fibers, e.g., sheath-core fibers where the sheath comprises a polyolefin, to increase peel strength between the non-woven scrim and the core layer as compared to a peel strength provided by a comparable non-woven scrim comprising a plurality of single component fibers, e.g., fibers without a sheath material.

Additional features, aspects, examples, configurations and embodiments are described in more detail below.

BRIEF DESCRIPTION OF THE FIGURES

Certain embodiments are described with reference to the accompanying figures in which.

Figure 1A:
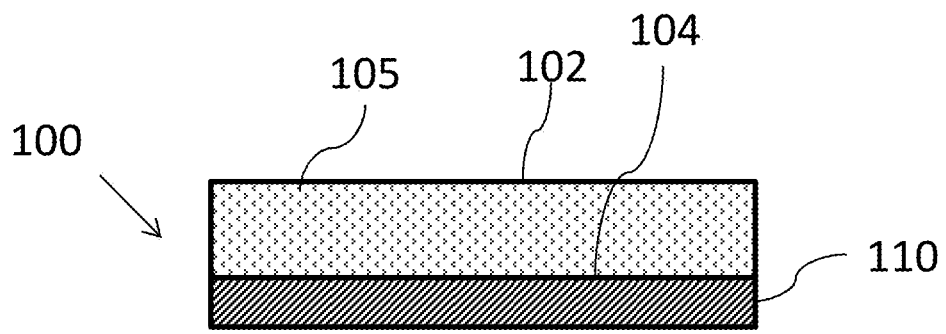
FIG. 1A is an illustration of a prepreg comprising a surface layer comprising bi-component fibers which can enhance formability, in accordance with certain examples.

It will be recognized by the person of ordinary skill in the art, given the benefit of this disclosure, that certain dimensions or features in the figures may have been enlarged, distorted or shown in an otherwise unconventional or non-proportional manner to provide a more user friendly version of the figures. No particular thickness, width or length is intended by the depictions in the figures, and relative sizes of the figure components are not intended to limit the sizes of any of the components in the figures. Where dimensions or values are specified in the description below, the dimensions or values are provided for illustrative purposes only. In addition, no particular material or arrangement is intended to be required by virtue of shading of certain portions of the figures, and even though different components in the figures may include shading for purposes of distinction, the different components can include the same or similar materials, if desired. In some instances, core layers that comprise fibers, thermoplastic materials and optionally lofting agents are shown as including stubble or dots for illustration purposes. The arrangement of the stubbles and dots is not intended to imply any particular distribution unless otherwise specified in the context of describing that particular figure.

DETAILED DESCRIPTION

Certain embodiments are described below with reference to singular and plural terms in order to provide a more user friendly description of the technology disclosed herein. These terms are used for convenience purposes only and are not intended to limit the prepregs, cores, articles, composites and other subject matter as including or excluding certain features unless otherwise noted as being present in, or excluded from, a particular embodiment described herein.

In certain instances, thermoplastic composite articles are often formed, e.g., molded or processed, into various shapes to provide a final formed part or article. In some instances, the articles are formed into parts used in the automotive industry including, but not limited to, headliners, rear window trim, trunk trim, door trim, seat backs, pillars, and compartment covers. During forming processes, forming or drawing of one or more areas of the thermoplastic areas can result in breakthrough, e.g., tears, slits, holes, etc. as the materials may fail if drawn to deeply. In certain examples described herein, the presence of a surface layer comprising bi-component fibers can permit drawing of the composite article to increased depths, e.g., 10 cm, 20 cm, 30 cm, 40 cm or more without breakthrough of the article in the drawn areas. The exact formed or draw depth of the thermoplastic article can depend on the dimensions of the span of the formed or drawn area. While not wishing to be bound by any particular measurement, one useful measurement is to compare depth of draw ratios As used herein, depth of draw ratio refers to the cavity depth divided by the maximum horizontal dimension of the cavity. For example, for a truncated cone, e.g., a truncated cone with a frustum or a conical frustum, with a base diameter of about 40 mm and a draw depth or height of about 20 mm, the depth of draw ratio would be about 0.5 (20 mm/40 mm). By using the surface layers with bi-component fibers described herein, it is possible to achieve higher depth of draw ratios without breakthrough as compared to depth of draw ratios achievable without breakthrough when a surface layer comprising a single component fiber is used. Various illustrations below refer to depth of draw ratio for comparison purposes.

In some instances, the surface layers described herein can be used to increase the depth of draw ratio by 10%, 20%, 30%, 40% or 50% without breakthrough at the drawn areas. As a control or reference, the increase in depth of draw ratio may be compared to a similar composite article including a surface layer comprising a similar composition single component fiber. For example, the control or reference may comprise a surface layer comprising polyethylene fibers, and the surface layer of the composite articles with enhanced formability may comprise sheath-core fibers where the core fibers comprises polyethylene and the sheath comprises a thermoplastic material. In some examples, the depth of draw ratio for at least one drawn area of the composite articles with enhanced formability may be at least 0.8 without breakthrough or at least 1.0 without breakthrough or at least 1.25 without breakthrough or at least 1.4 or 1.5 without breakthrough at the drawn area.

In certain configurations, the articles described herein can comprise a prepreg or core layer. While not wishing to be bound by any particular theory, a prepreg is generally not a fully formed or processed version of a core. For example, a partially cured layer comprising a thermoplastic material, a plurality of reinforcing fibers and optionally a lofting agent is generally referred to as a prepreg, whereas a fully cured layer comprising thermoplastic material, a plurality of reinforcing fibers and optionally a lofting agent is generally referred to as a core or core layer. As noted herein, even though the core may be considered cured, the core can still be coupled to one or more surface layers (or other layers) to alter the overall properties of a composite article comprising the core layer. The description below makes reference to both a prepreg and a core, and the materials (and their amounts and properties) used in connection with a prepreg can also be used or present in a core if desired.

As noted in more detail below, the articles described herein are generally porous and can permit the passage of fluids, e.g., gases into and out of the articles. In some examples, the various components of the articles can be selected such that the articles do not function as a barrier to fluid flow. In other examples, the prepreg or core of the articles may be porous and the article may comprise one or more surface layers which can function as a barrier or may be a non-barrier. In some examples, the prepregs and cores of the articles described herein are not extruded articles as extrusion can reduce the porosity to about 0% and affect the lofting ability of the articles described herein.

In certain embodiments, the enhanced formability of the articles described herein can permit a reduction in the basis weight of the prepreg or core layer while still permitting deep drawing of the article to a desired depth. In some examples, the basis weight of the core can be reduced by 5%, 10%, 15%, 20%, 25%, 30% or even 35% when a surface layer comprising a bi-component fiber is used as compared to a conventional surface layer, e.g., when a scrim comprising sheath-core fibers is used as compared to the same scrim comprising the same core fibers without a sheath material.

Referring to FIG. 1A, an article 100 comprises a prepreg 105 coupled to a surface layer 110, e.g. a scrim, comprising bi-component fibers at a surface 104. If desired, the surface layer 110 could instead be coupled to the surface 102, or, as noted below, or a scrim can be coupled to each of the surfaces 102, 104. If desired, each scrim coupled to the surfaces 102, 104 may comprise bi-component fibers. The prepreg 105 comprises a thermoplastic material and a plurality of reinforcing fibers. As noted in more detail below, the reinforcing fibers of the prepreg may be single component fibers or bi-component fibers as desired. The prepreg 105 also optionally comprises a lofting agent dispersed through the prepreg 105. In some instances, the materials in the prepreg 100 can be substantially homogeneous or substantially uniformly dispersed from a first surface 102 to a second surface 102 of the prepreg 105. As described in more detail herein, to achieve such substantially homogeneous or substantially uniform distribution of the materials in the prepreg 105, the components of the prepreg 105 can be mixed together to form a dispersion. Mixing can be performed until the dispersion comprises a substantially homogeneous or substantially uniform mixture of the reinforcing fibers and the optional lofting agent in the dispersion. The prepreg 105 may then be formed as described herein, e.g., by disposing the dispersion on a wire screen using a suitable laying process, or using other suitable techniques. In other configurations, it may be desirable to provide a gradient distribution of either the reinforcing fibers or the lofting agent or both from the first surface 102 to the second surface 104 such that more of one of the materials is present towards one of the surfaces 102, 104 than the other surface. A gradient of reinforcing fibers or lofting agent can be produced, for example, by spraying or coating additional reinforcing fibers or lofting agent onto a surface of the prepreg 105. The prepreg 105 may also comprise a second type of fiber different from the first type. The second type of fiber can be hydrophilic fibers, e.g., glass fibers, thermoplastic fibers, etc. Further, the second type of fiber may be the same general type of fiber as the first, e.g., both fibers may be reinforcing fibers of the same composition, but the fibers may comprise different lengths, different diameters, etc.

In certain configurations, the thermoplastic material of the prepreg may be present in fiber form, particle form, resin form or other suitable forms. In some instances, the thermoplastic material used in the prepreg can be present in particle form. For example, thermoplastic particles can be mixed with the reinforcing fibers, the lofting agent and any other particles or materials which are present to provide a dispersion of the materials. The dispersion can be used to provide the prepreg 105 by forming of a generally planar structure or board and permitting the board to solidify or harden. In certain embodiments, the prepreg 105 generally comprises a substantial amount of open cell structure such that void space is present in the prepreg. For example, the prepreg layer 105 may comprise a void content or porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. In some instances, the prepreg comprises a porosity or void content of greater than 0%, e.g., is not fully consolidated, up to about 95%. Unless otherwise stated, the reference to the prepreg comprising a certain void content or porosity is based on the total volume of the prepreg and not necessarily the total volume of the prepreg plus any other materials or layers coupled to the prepreg to form the final article. While the exact porosity can vary, a prepreg produced using reinforcing fibers and a thermoplastic material, e.g., reinforcing fibers in combination with a polyolefin thermoplastic material, may have a porosity of about 5% to about 90%, or about 10% to about 75%, or about 15% to about 60% or about 20% to about 55%.

In certain embodiments, the thermoplastic material of the prepregs described herein may comprise, at least in part, one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as alloys and blends of these materials with each other or other polymeric materials with processing temperature lower than the thermal degradation temperature of the reinforcing fibers. The thermoplastic material used to form the prepreg can be used in powder form, resin form, rosin form, fiber form, combinations thereof or other suitable forms. Illustrative thermoplastic materials in various forms are described herein and are also described, for example in U.S. Publication Nos. 20130244528 and US20120065283. The exact amount of thermoplastic material present in the prepreg can vary and illustrative amounts range from about 20% by weight to about 80% by weight. As noted in more detail below, any one or more of these thermoplastic materials can be coated onto fibers of a non-prepreg layer, e.g., a scrim, or can be present on the fibers themselves prior to formation of the non-prepreg layer.

In certain examples, the reinforcing fibers present in the prepreg 105 may include many kinds of fibers or mixtures thereof. For example, the prepreg 105 may comprise glass fibers, carbon fibers, graphite fibers, synthetic organic fibers, particularly high modulus organic fibers such as, for example, para- and meta-aramid fibers, nylon fibers, polyester fibers, or materials described herein that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. The total fiber content in the prepreg may be from about 20% to about 80% by weight of the prepreg, more particularly from about 30% to about 70%, by weight of the prepreg. Typically, the fiber content of a composite article comprising the prepreg varies between about 20% to about 60% by weight.

In certain examples, the particular size and/or orientation of the fibers used may depend, at least in part, on the polymer material used and/or the desired properties of the resulting prepreg 105. Illustrative reinforcing fibers dispersed within a thermoplastic material may comprise a diameter of greater than about 5 microns, more particularly from about 5 microns to about 22 microns, and a length of from about 5 mm to about 200 mm or about 5 mm to about 100 mm or about 5 mm to about 50 mm or about 5 mm to about 20 mm. In some instances, the fiber diameter may be from about five microns to about 22 microns, and the fiber length may be from about 5 mm to about 75 mm. In other instances, the fiber diameter may be about ten microns to about 20 microns and the length may be about 5 mm to about 15 mm.

In some instances, the reinforcing fibers present in the prepreg may be sheath-core reinforcing fibers. For example, as noted below, the bi-component fibers present in a surface layer such as a scrim may comprise a sheath-core structure. If desired, the reinforcing fibers present in the prepreg may also comprise one or more sheath-core fibers. In some examples, the sheath material present on core reinforcing fibers of the prepreg may be the same material as is present as a sheath material on fibers present in a surface layer. In other examples, the sheath material present on core reinforcing fibers of the prepreg may be a different sheath material than the sheath material present on core fibers present in a surface layer. In some instances, the reinforcing fibers of the prepreg may comprise a polyolefin sheath, e.g., polyethylene, polypropylene, etc. The polyolefin may be a low density polyolefin, a high density polyolefin or combinations thereof. In some examples, the sheath material the reinforcing fibers may be selected such that it melts or flows during processing of the prepreg, whereas the underlying core fiber material generally does not melt or flow during processing of the prepreg.

In some configurations, the prepreg 105 may be a substantially halogen free or halogen free prepreg to meet the restrictions on hazardous substances requirements for certain applications. In other instances, the prepreg 105 may comprise a halogenated flame retardant agent such as, for example, a halogenated flame retardant that comprises one of more of F, Cl, Br, I, and At or compounds that including such halogens, e.g., tetrabromo bisphenol-A polycarbonate or monohalo-, dihalo-, trihalo- or tetrahalo-polycarbonates. In some instances, the thermoplastic material used in the prepregs and cores may comprise one or more halogens to impart some flame retardancy without the addition of another flame retardant agent. Where halogenated flame retardants are present, the flame retardant is desirably present in a flame retardant amount, which can vary depending on the other components which are present. For example, the halogenated flame retardant may be present in about 0.1 weight percent to about 15 weight percent (based on the weight of the prepreg 105), more particularly about 1 weight percent to about 13 weight percent, e.g., about 5 weight percent to about 13 weight percent. If desired, two different halogenated flame retardants may be added to the prepreg. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the prepregs may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 15 weight percent (based on the weight of the prepreg), more particularly about 1 weight percent to about 13 weight percent, e.g., about 5 weight percent to about 13 weight percent based on the weight of the prepreg 105. If desired, two different substantially halogen free flame retardants may be added to the prepreg 105. In certain instances, the prepregs described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 20 weight percent (based on the weight of the prepreg 105), more particularly about 1 weight percent to about 15 weight percent, e.g., about 2 weight percent to about 14 weight percent based on the weight of the prepreg 105. The flame retardant agents used in the prepregs described herein can be added to the mixture comprising the thermoplastic material and reinforcing fibers or can be added after the prepreg 105 is formed. In some examples, the prepreg may comprise carbon black, expandable graphite materials or an inorganic flame retardant such as, for example, magnesium hydroxide or aluminum hydroxide.

In certain embodiments, where a lofting agent is present in the prepreg 105, the lofting agent can be used to increase (or decrease) the overall size, e.g., thickness, of the prepreg 105 by changing the temperature. In some instances, heating of a prepreg 105 comprising a lofting agent increases the overall thickness of the prepreg 105. The exact lofting temperature used can vary and is typically selected so it is below the thermal degradation temperature of the reinforcing fibers and above the melting/softening point of the thermoplastic material. Further, the amount of lofting agent can vary as desired. In some examples, the prepreg 105 can be pressed to a pre-loft thickness and further processing, e.g., thermoforming, molding, etc., can be performed to permit the thickness or the prepreg 105 to increase to a desired thickness. Further, softening of the prepreg can also serve to permit deep drawing or use other processes which can form multi-dimensional structures from the prepreg 105. In some examples, the lofting agent may be a microsphere based lofting agent, expandable graphite materials, chemical foaming agents, or combinations thereof. The amount of lofting agent present in the prepreg 105 may vary, for example, from about one weight percent to about ten weight percent based on the weight of the prepreg 105.

Figure 1B:
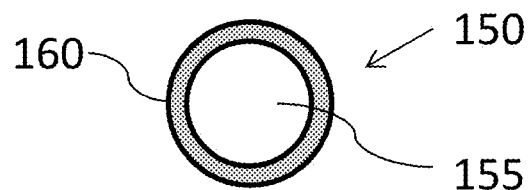
FIG. 1B is an illustration of a bi-component fiber, in accordance with certain configurations.

In certain configurations, the surface layer 110 may comprise a plurality of fibers, e.g., a plurality of bi-component fibers. While the exact configuration of the bi-component fibers may vary, in some examples, the fibers can sheath-core, shell-core or coated fibers to enhance formability of the article 100 during processing. For example, the surface layer 110 may comprise fibers produced from a first core material which have a sheath or shell of a second different material such that coupling of the surface layer 110 to the prepreg 105 (or a core) provides enhanced elongation of the article 100 as compared to the elongation that results when a comparable surface layer lacking the sheath or shell material is present. In some examples, when compared to a control scrim, e.g., a scrim comprising fibers of a first composition which lack a sheath material, a scrim with the bi-component fibers may have elongation that is at least 30%, 40%, 50%, 60%, or 70% in one or both of the machine direction and the cross direction. The enhanced elongation of the scrim permits, at least in part, drawing of the articles to increased depths (in at least certain areas) without breakthrough, e.g., without tearing. Elongation of the scrim or surface layer can be measured in numerous ways including, for example, using the ASTM 5304-09(2013) test entitled "Breaking Strength and Elongation of Textile Fabrics Grab Test." In certain embodiments, the presence of the surface layer 110 permits an increase in the depth of draw ratio by at least 10% more without breakthrough than a depth of draw ratio in a comparable article lacking sheath-core fibers in the surface layer. In some embodiments, the presence of the surface layer 110 permits an increase in the depth of draw ratio by at least 20% more without breakthrough than a depth of draw ratio in comparable article lacking the sheath-core fibers in the surface layer. In other embodiments, the presence of the surface layer 110 permits an increase in the depth of draw ratio by at least 30% without breakthrough more than a depth of draw ratio in a comparable article lacking the sheath-core fibers in the surface layer. In some embodiments, the presence of the surface layer 110 permits an increase in the depth of draw ratio by at least 40% more without breakthrough than a depth of draw ratio in a comparable article lacking the sheath-core fibers in the surface layer. In certain embodiments, the presence of the surface layer 110 permits an increase in the depth of draw ratio by at least 50% more without breakthrough than a depth of draw ratio in a comparable article lacking the sheath-core fibers in the surface layer without breakthrough. In some embodiments, the basis weight of the surface layer may be about 10 gsm to about 100 gsm, e.g., 10 gsm, 20, gsm, 30 gsm, 40 gsm, 50 gsm, 60 gsm, 70 gsm, 80 gsm, 90 gsm, 100 gsm, 40-60 gsm or other basis weights while still being effective to provide enhanced formability when used in the composite article. In other embodiments, the bi-component fibers may not necessarily comprise a coating but may comprise two different materials used together to provide the fiber, e.g., a sheath material may surround a core material. In addition, tri-component, tetra-component and other multi-component fibers can also be used. For example, a base fiber material can be coated with, or may comprise, two different materials to provide a tri-component fiber which can be used in a surface layer of an article comprising a porous core layer. One illustration of a bi-component fiber is shown in FIG. 1B, where a bi-component fiber 150 comprises a core fiber 155 and a sheath or shell material 160 surrounding the core fiber 155. The bi-component fiber 150 may be considered a sheath-core or shell-core with the core being the fiber 155 and the sheath or shell being the material 160, e.g., the sheath-core fibers can be considered a fiber within a fiber. While for illustration purposes the sheath 160 is shown as surrounding all sides of the core fiber 155, the sheath material 160 need not be uniform at all surfaces of the core fiber 155. In addition, other sheath materials or coatings may be disposed on the sheath material 160 to provide multi-component fibers for use in a surface layer.

In some examples, the sheath material of the fibers of the surface layer 110 may comprise the same thermoplastic material present in the prepreg 105. In other examples, the sheath material of the fibers of the surface layer 110 may comprise a different material than the thermoplastic material present in the prepreg 105. In yet other examples, the sheath material of the fibers of the surface layer 110 may comprise the same general class, e.g., a polyolefin, as the thermoplastic material of the prepreg 105, e.g., both materials may be a thermoplastic material, but the specific material used may be different, e.g., the prepreg 105 may comprise polypropylene and the sheath material of the fibers of the surface layer 110 may comprise polyethylene. The exact type of core fibers present in the scrim can vary, and illustrative fibers include, but are not limited to, glass fibers, nylon fibers, aramid fibers, graphite fibers, carbon fibers, inorganic mineral fibers, metal fibers, metalized synthetic fibers, metalized inorganic fibers, polyester fibers and thermoplastic fibers. Where polyester fibers are used in the core fibers, the polyester material may be one or more of polymethylene terephthalate, polyethylene terephthalate, polypropylene terephthalate, polybutylene terephthalate or other materials comprising two or more ester groups. Notwithstanding that many different fiber types can be used, in some configurations, the fibers used in the surface layer 110 desirably have a higher melting point than the thermoplastic material present in the prepreg 105. This configuration permits softening or melting of the prepreg 105 by heating without substantial softening/melting of the core fibers in the surface layer 110. The sheath material of the fibers of the surface layer 110 may comprise a softening/melting point lower than, the same as or higher than the thermoplastic material of the prepreg 105. For example, in some instances the coating on the fibers of the surface layer 110 may soften/melt (at least to some extent) during forming of the article 100. In some configurations, the sheath material on the fibers of the surface layer 110 may be a polyolefin, e.g., polyethylene, polypropylene, etc. and the fibers used in the surface layer may comprise thermoplastic fibers, e.g., polyethylene terephthalate or other fibers.

In certain examples, the exact percentage of sheath-core fibers present in the surface layer 110 may vary from at least 80% by weight based on the total weight of the fibers present in the surface layer 110, to at least 90% by weight, at least 95% by weight, at least 99% by weight or even 100% by weight. In some examples, substantially all fibers present in the surface layer 110 are bi-component fibers, e.g., sheath-core fibers, to provide enhanced formability to the article. As noted in more detail below, the surface layer 110 can be produced in numerous manners including pre-forming of the surface layer 110 by forming the surface layer of sheath-core fibers into a desired structure. In some examples, core fibers are used to form the surface layer 110, and then the formed surface layer 110 is dipped into the coating, soaked in the coating, sprayed with the coating or the coating is otherwise provided in some manner to the formed surface layer 110 to provide the surface layer comprising sheath-core fibers. In further examples, the sheath material can be applied to the surface layer 110 before the surface layer 110 is coupled to the prepreg 105 or after the surface layer 110 is coupled to the prepreg 105. In some instances, the formed article, e.g., core+surface layer comprising core fibers, is soaked or dipped into a coating of the sheath material to be applied to the core fibers of the surface layer, and the resulting article can be dried, heated or further processed, if desired, to form the article into a desired shape or component, e.g., vehicle trim or other interior or exterior components of an automobile. The surface layer 110 typically comprises a non-woven arrangement of the sheath-core fibers, though other arrangements and configurations are possible depending on the techniques used to produce the surface layer 110.

Figure 2:
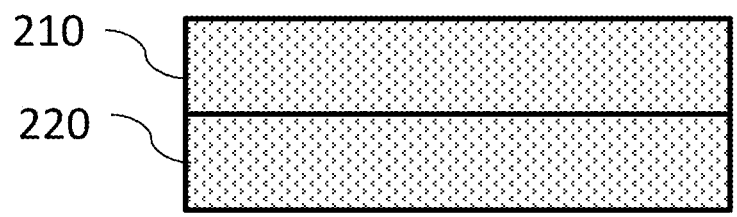
FIG. 2 is an illustration of two stacked core layers and a layer comprising bi-component fibers which can enhance formability, in accordance with certain embodiments.

In certain configurations, the articles described herein may comprise a porous core. In certain examples, the porous core comprises one or more thermoplastic materials and a plurality of reinforcing fibers that can be held in place by the formed thermoplastic material in a web or network structure to provide a plurality of open cells, void space or a web in the core. In certain configurations, a core similar to the prepreg of FIG. 1 can be produced. The core comprises the reinforcing fibers and optionally a lofting agent dispersed throughout the core. In some instances, the distribution of the reinforcing fibers and/or lofting agent in the core can be substantially homogeneous or substantially uniform from a first surface to a second surface of the core. As described in more detail herein, to achieve such substantially homogeneous or substantially uniform distribution of the materials in the core, the components of the core can be mixed together to form a dispersion. Mixing can be performed until the dispersion comprises a substantially homogeneous or substantially uniform mixture of the materials in the dispersion. The core may then be formed as described herein, e.g., by disposing the dispersion on a wire screen using a suitable laying process followed by compressing and/or curing of the thermoplastic material of the core. In other configurations, it may be desirable to provide a gradient distribution of reinforcing fibers, lofting agent, etc. from one surface of the core to the other surface of the core. In some configurations, a substantially uniform distribution of the materials are present in a core and then additional fibers, lofting agent or other materials can be added to one side of the core to provide a gradient distribution. Such additional materials can be added directly to the core, e.g., by spraying or coating a solution comprising the fibers or lofting agent, or can be added by coupling a skin, additional prepreg or core or other component comprising the core. For example and referring to FIG. 2, a first core 210 and a second core 220 disposed on the first core 210 can provide a composite article. Each of the cores 210, 220 may comprise a substantially uniform distribution of materials, but the amount and/or type of fibers present in the two cores 210, 220 can be different, e.g., the loading rates can be different or the materials themselves may be different. If desired, however, only one of the cores may comprise two or more different types of thermoplastic materials, two or more different types of reinforcing fibers and/or two or more different types of lofting agents. The thermoplastic materials of the cores 210, 220 can be melted to provide a single combined core including materials from the two cores, e.g., a combined core without any substantial interface between the original cores 210, 220. The result of melting of the cores is a composite core with a mixture of the materials from the two different cores 210, 220.

In certain configurations, the thermoplastic material of the core may be used in the core in a fiber form, particle form, resin form or other suitable forms. In some examples, the thermoplastic material used in the core can be present in particle form. In certain embodiments, the core generally comprises a substantial amount of open cell structure such that void space is present in the core. For example, the core layer may comprise a void content or porosity of 0-30%, 10-40%, 20-50%, 30-60%, 40-70%, 50-80%, 60-90%, 0-40%, 0-50%, 0-60%, 0-70%, 0-80%, 0-90%, 5-30%, 5-40%, 5-50%, 5-60%, 5-70%, 5-80%, 5-90%, 5-95%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. In some instances, the core comprises a porosity or void content of greater than 0%, e.g., is not fully consolidated, up to about 95%. For example, the core may comprise a porosity greater than 5% or 10% but less than 90% or 95%. Unless otherwise stated, the reference to the core comprising a certain void content or porosity is based on the total volume of the core and not necessarily the total volume of the core plus any other materials or layers coupled to the core. Compared to a prepreg, the porosity of the core can be the same or can be different. For example, in many instances, a prepreg is formed into a core by passing a prepreg through a set of rollers or by pressing one or more surfaces of the prepreg. In such instances, the porosity of the core may be different than the porosity of the prepreg, e.g., the porosity of the core can be lower than a prepreg used to provide the final core. In some instances, the porosity of the core is intentionally selected to be less than a comparable prepreg to provide for increased lofting capacity to permit use of the core (and any coupled layers) into a final formed article or product.

In certain embodiments, the thermoplastic material of the cores described herein may comprise, at least in part, one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as alloys and blends of these materials with each other or other polymeric materials. The thermoplastic material used to form the core can be used in powder form, resin form, rosin form, fiber form or other suitable forms.

Illustrative thermoplastic materials in various forms are described herein and are also described, for example in U.S. Publication Nos. 20130244528 and US20120065283. The exact amount of thermoplastic material present in the core can vary and illustrative amounts range from about 20% by weight to about 80% by weight or about 40% by weight to about 75% by weight, e.g., about 55% by weight to about 65% by weight. As noted in more detail below, any one or more of these thermoplastic materials can be coated onto fibers of a non-core layer, e.g., a scrim, or can be present on the fibers themselves prior to formation of the non-core layer.

In certain examples, the fibers of the cores described herein may one or more of glass fibers, carbon fibers, graphite fibers, synthetic organic fibers, particularly high modulus organic fibers such as, for example, para- and meta-aramid fibers, nylon fibers, polyester fibers, or any of the thermoplastic materials described herein that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some embodiments, fibers other than reinforcing fibers may also be present in the core. The fiber content in the core may be from about 20% to about 90% by weight of the core, more particularly from about 30% to about 70%, by weight of the core, for example about 35% by weight to about 55% by weight based on the weight of the core. The particular size and/or orientation of the fibers used may depend, at least in part, on the other materials present in the core and/or the desired properties of the resulting core. In some instances, fibers which are used to provide a core generally have a diameter of greater than about 5 microns, more particularly from about 5 microns to about 22 microns, and a length of from about 5 mm to about 200 mm; more particularly, the fiber diameter may be from about 5 microns to about 20 microns and the fiber length may be from about 5 mm to about 75 mm. In other instances, the fiber diameter may be about ten microns to about 20 microns and the length may be about 5 mm to about 15 mm.

In some instances, the core may be a substantially halogen free or halogen free core to meet the restrictions on hazardous substances requirements for certain applications. In other instances, the core may comprise a halogenated flame retardant agent such as, for example, a halogenated flame retardant that comprises one of more of F, Cl, Br, I, and At or compounds that including such halogens, e.g., tetrabromo bisphenol-A polycarbonate or monohalo-, dihalo-, trihalo- or tetrahalo-polycarbonates. In some instances, the thermoplastic material used in the cores may comprise one or more halogens to impart some flame retardancy without the addition of another flame retardant agent. Where halogenated flame retardants are present, the flame retardant is desirably present in a flame retardant amount, which can vary depending on the other components which are present. For example, the halogenated flame retardant may be present in about 0.1 weight percent to about 15 weight percent (based on the weight of the core), more particularly about 1 weight percent to about 13 weight percent, e.g., about 5 weight percent to about 13 weight percent. If desired, two different halogenated flame retardants may be added to the core. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the cores may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 15 weight percent (based on the weight of the core), more particularly about 1 weight percent to about 13 weight percent, e.g., about 5 weight percent to about 13 weight percent based on the weight of the cores. If desired, two different substantially halogen free flame retardants may be added to the cores. In certain instances, the cores described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 20 weight percent (based on the weight of the core), more particularly about 1 weight percent to about 15 weight percent, e.g., about 2 weight percent to about 14 weight percent based on the weight of the core. The flame retardant agents used in the cores described herein can be added to the mixture comprising the reinforcing fibers, thermoplastic material and optionally the lofting agent (prior to disposal of the mixture on a wire screen or other processing component) or can be added after the core is cured, e.g., by soaking the core in the flame retardant agent or spraying flame retardant agent on the core. Further, the flame retardant agents can be sprayed onto the reinforcing fibers, the thermoplastic materials, the lofting agent, etc. prior to combining the components in a mixture used to form a prepreg or core.

Figure 3:
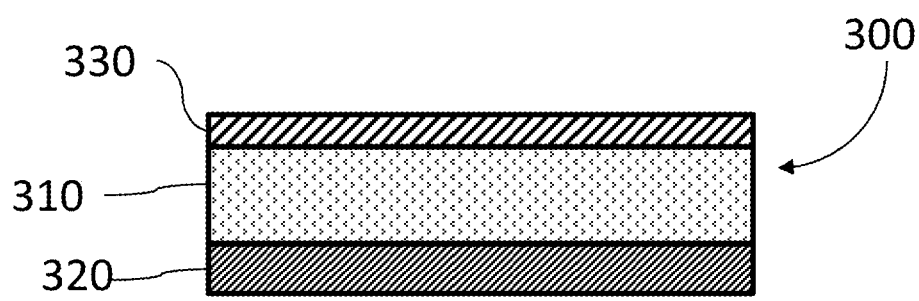
FIG. 3 is an illustration showing a prepreg or core coupled to a skin and a layer comprising sheath-core fibers which can enhance formability, in accordance with certain examples.

In certain embodiments, the prepregs or cores described herein may comprise one or layers, e.g., skins, disposed on a surface of the prepreg or core to provide an article. Referring to FIG. 3, an article 300 comprises a prepreg or core 310, and a surface layer 320 comprising bi-component fibers, e.g., sheath-core fibers such as a scrim comprising sheath-core fibers, to enhance the formability of the article 300. Where sheath-core fibers are present in the surface layer 320, the exact sheath material present in the fibers of the surface layer 320 can vary and illustrative coatings including but are not limited to, polyolefins such as polyethylene, polypropylene, etc. and other materials which can soften or melt to some extent during processing. In addition, the core fibers of the surface layer 320 can vary and can include, for example, one or more of glass fibers, aramid fibers, graphite fibers, carbon fibers, inorganic mineral fibers, metal fibers, metalized synthetic fibers, metalized inorganic fibers, polyethylene terephthalate fibers (PET), and thermoplastic fibers. In some instances, the surface layer 320 may comprise a fiber based scrim comprising sheath-core fibers where the sheath material comprises a polyolefin material, e.g., PET fibers, aramid fibers or glass fibers with a sheath material of polyethylene, polypropylene or combinations thereof. The article 300 also comprises a layer 330 disposed on the prepreg or core 310. The layer or skin 330 may comprise, for example, a film (e.g., thermoplastic film or elastomeric film), a frim, a scrim (e.g., fiber based scrim), a foil, a woven fabric, a non-woven fabric or be present as an inorganic coating, an organic coating, or a thermoset coating disposed on the prepreg or core 310. In some examples, the layers 320, 330 can be the same whereas in other instances they are different. For example, the layer 320 may comprise a scrim comprising bi-component fibers and the layer 330 may comprise any of one or more of a film (e.g., thermoplastic film or elastomeric film), a frim, a scrim (e.g., fiber based scrim), a foil, a woven fabric, a non-woven fabric or be present as an inorganic coating, an organic coating, or a thermoset coating. In other instances, the layer 320 may comprise a scrim comprising bi-component fibers and the layer 330 may comprise a scrim without any bi-component fibers. In some configurations, each of the layers 320, 330 may comprise a scrim comprising bi-component fibers but the coatings on the scrims can be the same or different, e.g., where the bi-component fibers are sheath-core fibers the materials may have a different composition or the composition can be the same but the amount of sheath-core fibers in the different layers 320, 330 can be different. In other instances, the layer 330 may comprise a limiting oxygen index greater than about 22, as measured per ISO 4589 dated 1996. Where a thermoplastic film is present as (or as part of) the skin 330, the thermoplastic film may comprise at least one of poly(ether imide), poly(ether ketone), poly(ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present as (or as part of) the skin 330, the fiber based scrim may comprise at least one of glass fibers, aramid fibers, graphite fibers, carbon fibers, inorganic mineral fibers, metal fibers, metalized synthetic fibers, metalized inorganic fibers and fibers. Where a thermoset coating is present as (or as part of) the skin 330, the coating may comprise at least one of unsaturated polyester, polyurethanes, vinyl esters, phenolics and epoxies. Where an inorganic coating is present as (or as part of) the skin 330, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the skin 330, the non-woven fabric may comprise a thermoplastic material, a thermal setting binder, inorganic fibers, metal fibers, metallized inorganic fibers and metallized synthetic fibers. The prepreg or core 310 may comprise any of the materials described herein in connection with prepregs and cores, e.g., a thermoplastic material, reinforcing fibers and a lofting agent dispersed in the prepreg or core 310. For example, the prepreg or core 310 may comprise a polyolefin in combination with reinforcing fibers, e.g., glass fibers, and optionally one or more lofting agents such as, for example, microspheres.

Figure 4:
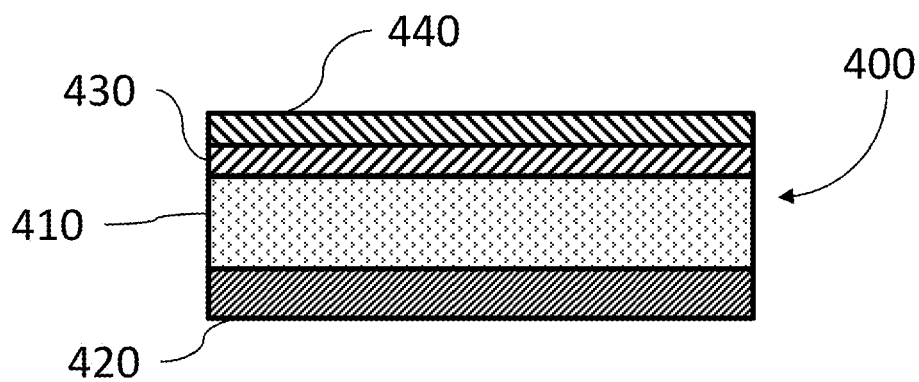
FIG. 4 is an illustration showing a prepreg or core coupled to two or more skins and a layer comprising sheath-core fibers which can enhance formability, in accordance with certain examples.

In certain configurations, the prepregs and cores described herein can be used to provide an article comprising a skin on each side of the prepreg or core with two or more layers on any one side of the prepreg or core. Referring to FIG. 4, an article 400 is shown comprising a prepreg or core 410, a surface layer 420 disposed on a first surface of the prepreg or core 410, a layer 430 disposed on a second surface of the prepreg or core 410 and a surface layer 440 disposed on the layer 430. The prepreg or core 410 may comprise any of the materials described herein in connection with prepregs and cores, e.g., a thermoplastic material, reinforcing fibers and an optional lofting agent. The surface layer 420 may comprise bi-component fibers, e.g., a scrim comprising sheath-core fibers, to enhance the formability of the article 400. Where sheath-core fibers are used in the surface layer 420, the exact sheath material present in the fibers of the surface layer 420 can vary and illustrative sheath materials include, but are not limited to, polyolefins such as polyethylene, polypropylene, etc. and other materials which can soften or melt to some extent during processing. In addition, the core fibers of the surface layer 420 can vary and can include, for example, one or more of glass fibers, aramid fibers, graphite fibers, carbon fibers, inorganic mineral fibers, metal fibers, metalized synthetic fibers, metalized inorganic fibers, polyethylene terephthalate fibers (PET), and thermoplastic fibers. In some instances, the surface layer 420 may comprise a fiber based scrim comprising sheath-core fibers where the sheath material comprises a polyolefin material, e.g., PET fibers, aramid fibers or glass fibers with a sheath material comprising polyethylene, polypropylene or combinations thereof. Each of the layers 430, 440 may comprise, for example, a film (e.g., thermoplastic film or elastomeric film), a frim, a scrim (e.g., fiber based scrim), a foil, a woven fabric, a non-woven fabric or be present as an inorganic coating, an organic coating, or a thermoset coating disposed on the prepreg or core 410. In some examples, the layer 420 and one or both of the layers 430, 440 can be the same whereas in other instances they are different. For example, the layer 420 may comprise a scrim comprising bi-component fibers and the layers 430, 440 may each comprise any of one or more of a film (e.g., thermoplastic film or elastomeric film), a frim, a scrim (e.g., fiber based scrim), a foil, a woven fabric, a non-woven fabric or be present as an inorganic coating, an organic coating, or a thermoset coating. In other instances, the layer 420 may comprise a scrim comprising bi-component fibers and one or both of the layers 430, 440 may comprise a scrim without any bi-component fibers. In some configurations, each of the layers 420, 430, 440 may comprise a scrim comprising bi-component fibers but the sheath materials on the scrims can be different, e.g., where the bi-component fibers are sheath-core fibers the sheath material may have a different composition or the composition can be the same but the amount of sheath-core fibers in the different layers 430, 430, 440 can be different. In other instances, the layers 430, 440 may each comprise a limiting oxygen index greater than about 22, as measured per ISO 4589 dated 1996. Where a thermoplastic film is present as (or as part of) one or both of the layers 430, 440, the thermoplastic film may comprise at least one of poly(ether imide), poly(ether ketone), poly(ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present as (or as part of) one or both of the layers 430, 440, the fiber based scrim may comprise at least one of glass fibers, aramid fibers, graphite fibers, carbon fibers, inorganic mineral fibers, metal fibers, metalized synthetic fibers, metalized inorganic fibers and fibers. Where a thermoset coating is present as (or as part of) one or both of the layers 430, 440, the coating may comprise at least one of unsaturated polyester, polyurethanes, vinyl esters, phenolics and epoxies. Where an inorganic coating is present as (or as part of) one or both of the layers 430, 440, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) one or both of the layers 430, 440, the non-woven fabric may comprise a thermoplastic material, a thermal setting binder, inorganic fibers, metal fibers, metallized inorganic fibers and metallized synthetic fibers. The prepreg or core 410 may comprise any of the materials described herein in connection with prepregs and cores, e.g., a thermoplastic material, reinforcing fibers and a lofting agent dispersed in the prepreg or core 410. For example, the prepreg or core 410 may comprise a polyolefin in combination with reinforcing fibers, e.g., glass fibers, and optionally one or more lofting agents such as, for example, microspheres.

Figure 5:
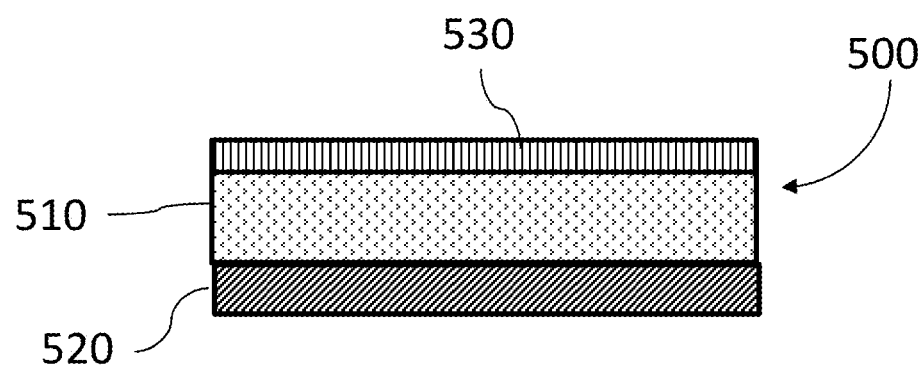
FIG. 5 is another illustration showing a prepreg or core comprising a decorative layer and a layer comprising sheath-core fibers which can enhance formability, in accordance with certain examples.

In certain instances, an article can comprise a prepreg or core, at least one skin disposed on the prepreg or core and a decorative or cover layer disposed on the skin. Referring to FIG. 5, an article 500 is shown comprising a prepreg or core 510, a surface layer 520 disposed on a first surface of the prepreg or core 510, and a decorative layer 530 disposed on a second surface of the prepreg or core 510. The prepreg or core 510 may comprise any of the materials described herein in connection with prepregs and cores, e.g., a thermoplastic material, reinforcing fibers and an optional lofting agent. The surface layer 520 may comprise bi-component fibers, e.g., a scrim comprising sheath-core fibers, to enhance the formability of the article 500. Where sheath-core fibers are used, the exact sheath material present on the core fibers of the surface layer 520 can vary and illustrative sheath materials include but are not limited to, polyolefins such as polyethylene, polypropylene, etc. and other materials which can soften or melt to some extent during processing. In addition, the core fibers of the surface layer 520 can vary and can include, for example, one or more of glass fibers, aramid fibers, graphite fibers, carbon fibers, inorganic mineral fibers, metal fibers, metalized synthetic fibers, metalized inorganic fibers, polyethylene terephthalate fibers (PET), and thermoplastic fibers. In some instances, the surface layer 520 may comprise a fiber based scrim comprising sheath-core fibers where the sheath material comprises a polyolefin material, e.g., PET fibers, aramid fibers or glass fibers with a sheath material comprising polyethylene, polypropylene or combinations thereof. The decorative layer 530 may be formed, e.g., from a thermoplastic film of polyvinyl chloride, polyolefins, thermoplastic polyesters, thermoplastic elastomers, or the like. The decorative layer 530 may also be a multi-layered structure that includes a foam core formed from, e.g., polypropylene, polyethylene, polyvinyl chloride, polyurethane, and the like. If desired, the decorative layer 530 may comprise one or more types of reinforcing fibers as well. A fabric may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer 530 may also be produced using spunbond, thermal bonded, spun lace, melt-blown, wet-laid, and/or dry-laid processes. If desired, one or more layers can be positioned between the decorative layer 530 and the prepreg or core 510. For example, an intermediate layer or skin may be present between the layer 530 and the prepreg or core 510. The intermediate layer may comprise, for example, an adhesive layer, a film (e.g., thermoplastic film or elastomeric film), a frim, a scrim (e.g., fiber based scrim), a foil, a woven fabric, a non-woven fabric or be present as an inorganic coating, an organic coating, or a thermoset coating disposed on the prepreg or core 510. In other instances, the intermediate layer may comprise a limiting oxygen index greater than about 22, as measured per ISO 4589 dated 1996. Where a thermoplastic film is present as an intermediate layer, the thermoplastic film may comprise at least one of poly(ether imide), poly(ether ketone), poly(ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present as an intermediate layer, the fiber based scrim may comprise at least one of glass fibers, aramid fibers, graphite fibers, carbon fibers, inorganic mineral fibers, metal fibers, metalized synthetic fibers, metalized inorganic fibers, and fibers. Where a thermoset coating is present, the coating may comprise at least one of unsaturated polyester, polyurethanes, vinyl esters, phenolics and epoxies. Where an inorganic coating is present as an intermediate layer, the inorganic coating may comprise minerals containing cations selected from Ca, Mg, Ba, Si, Zn, Ti and Al or may comprise at least one of gypsum, calcium carbonate and mortar. Where a non-woven fabric is present as an intermediate layer, the non-woven fabric may comprise a thermoplastic material, a thermal setting binder, inorganic fibers, metal fibers, metallized inorganic fibers and metallized synthetic fibers.

Figure 6:
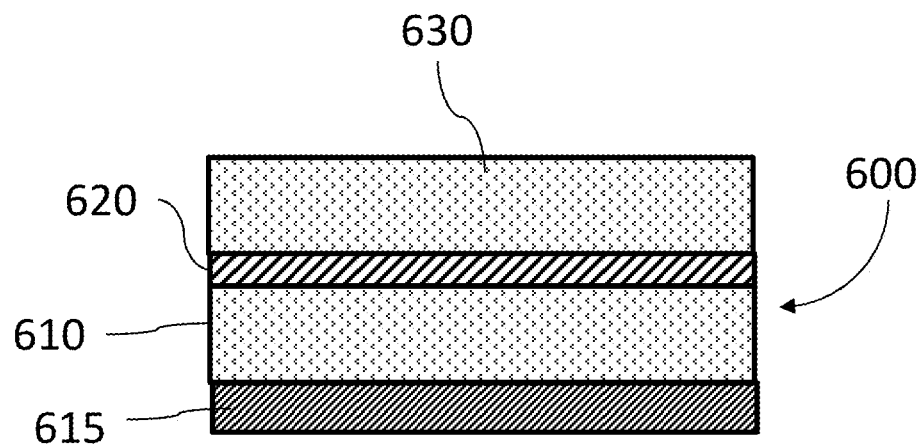
FIG. 6 is another illustration showing two prepregs or cores coupled to each other through a skin layer and comprising a layer comprising sheath-core fibers which can enhance formability, in accordance with certain examples.

In certain configurations, two or more prepregs or cores can be coupled to each other through an intervening or intermediate layer such as, for example, a skin. Referring to FIG. 6, an article 600 comprises a first prepreg or core 610 coupled to a prepreg or core 630 through an intermediate layer 620. The article 600 also comprises a surface layer 615 disposed on a first surface of the prepreg or core 610. The surface layer 615 may comprise bi-component fibers, e.g., a scrim comprising sheath-core fibers, to enhance formabiilty of the article 600 during forming operations. Where sheath-core fibers are used, the exact sheath material present on the sheath-core fibers of the surface layer 615 can vary and illustrative sheath material include but are not limited to, polyolefins such as polyethylene, polypropylene, etc. and other materials which can soften or melt to some extent during processing. In addition, the core fibers of the surface layer 615 can vary and can include, for example, one or more of glass fibers, aramid fibers, graphite fibers, carbon fibers, inorganic mineral fibers, metal fibers, metalized synthetic fibers, metalized inorganic fibers, polyethylene terephthalate fibers (PET), and thermoplastic fibers. In some instances, the surface layer 615 may comprise a fiber based scrim comprising sheath-core fibers where the sheath material comprises a polyolefin material, e.g., PET fibers, aramid fibers or glass fibers with a sheath material of polyethylene, polypropylene or combinations thereof. Each of the prepregs or cores 610, 630 may be the same or may be different. In some instances, the thermoplastic materials and lofting agents of the prepregs or cores 610, 630 are the same, but the fiber types or amount of fibers present in the prepregs or cores 610, 630 are different. In other instances, the type and/or amount of fibers in the prepregs or cores 610, 630 may be the same and one or both of the thermoplastic material and/or the lofting agent may be different, e.g., may be chemically different or may be present in differing amounts. If desired, one or more suitable flame retardant agents, e.g., halogenated or non-halogenated flame retardant agents may be present in one or both of the cores 610, 630. While the thickness of the prepregs or cores 610, 630 is shown as being about the same in FIG. 6, the thickness of the prepregs or cores 610, 630 can vary. Where a "thick" core is desired, it may be desirable to couple two "thin" core layers to each other through layer 620 to keep the core layers 610, 630 close to each other while still providing a composite with a desired final thickness. The intermediate layer 620 may take the form of a skin as described herein, e.g., one with fibers. The layer 620 may comprise an open cell structure to enhance bonding to the core layers 610, 630. The intermediate layer 620 may comprise, for example, an adhesive layer, a film (e.g., thermoplastic film or elastomeric film), a frim, a scrim (e.g., fiber based scrim), a foil, a woven fabric, a non-woven fabric or be present as an inorganic coating, an organic coating, or a thermoset coating disposed on the prepreg or core 610. In other instances, the layer 620 may comprise a limiting oxygen index greater than about 22, as measured per ISO 4589 dated 1996. Where a thermoplastic film is present, the thermoplastic film may comprise at least one of poly(ether imide), poly(ether ketone), poly(ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present as or in the layer 620, the fiber based scrim may comprise at least one of glass fibers, aramid fibers, graphite fibers, carbon fibers, inorganic mineral fibers, metal fibers, metalized synthetic fibers, metalized inorganic fibers and thermoplastic fibers. Where a thermoset coating is present as or in the layer 620, the coating may comprise at least one of unsaturated polyesters, polyurethanes, vinyl esters, phenolics and epoxies. Where an inorganic coating is present as or in the layer 620, the inorganic coating may comprise minerals containing cations selected from Ca, Mg, Ba, Si, Zn, Ti and Al or may comprise at least one of gypsum, calcium carbonate and mortar. Where a non-woven fabric is present as or in the layer 620, the non-woven fabric may comprise a thermoplastic material, a thermal setting binder, inorganic fibers, metal fibers, metallized inorganic fibers, metallized synthetic fibers or fibers. While not shown, a decorative layer can be coupled to the prepreg or cores 630 and/or to the surface layer 615 if desired. As noted herein, the decorative layer may be formed, e.g., from a thermoplastic film of polyvinyl chloride, polyolefins, thermoplastic polyesters, thermoplastic elastomers, or the like. The decorative layer may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers (some of which may be fibers), organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer may also be produced using spunbond, thermal bonded, spun lace, melt-blown, wet-laid, and/or dry-laid processes. If desired, the decorative layer may comprise a closed cell or open cell structure.

Figure 7:
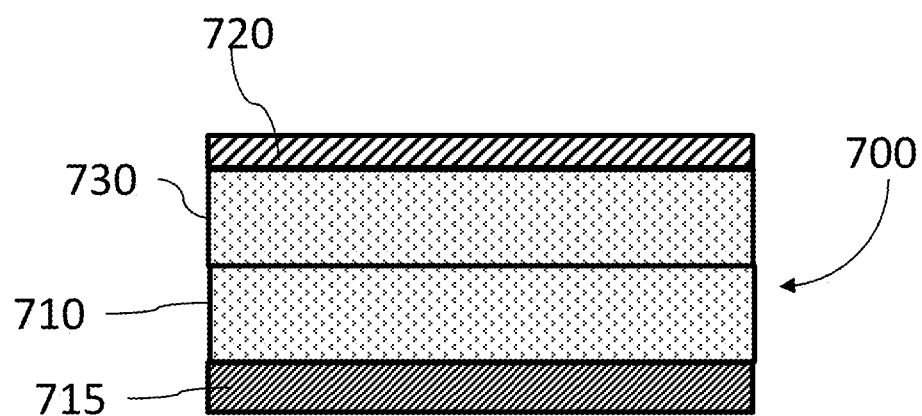
FIG. 7 is an illustration showing two prepregs or cores coupled to each other with a skin layer disposed on one of the core layers and a layer comprising sheath-core fibers which can enhance formability disposed on the other prepreg or core layer, in accordance with certain embodiments.

In certain embodiments, two or more prepregs or cores can be coupled to each other and then a skin may be disposed on one surface of the prepregs or cores. Referring to FIG. 7, an article 700 comprises a prepreg or core 710 coupled to a prepreg or core 730 and a surface layer 715 disposed on a first surface of the prepreg or core 710. The article also comprises a surface layer 720 disposed on the prepreg or core 730. The surface layer 715 may comprise bi-component fibers, e.g., a scrim comprising sheath-core fibers, to enhance the formability of the article 700, e.g., be deep drawn, during forming operations. Where sheath-core fibers are used, the exact sheath material present in the fibers of the surface layer 715 can vary and illustrative sheath materials include but are not limited to, polyolefins such as polyethylene, polypropylene, etc. and other materials which can soften or melt to some extent during processing. In addition, the core fibers of the surface layer 715 can vary and can include, for example, one or more of glass fibers, aramid fibers, graphite fibers, carbon fibers, inorganic mineral fibers, metal fibers, metalized synthetic fibers, metalized inorganic fibers, polyethylene terephthalate fibers (PET), and thermoplastic fibers. In some instances, the surface layer 715 may comprise a fiber based scrim comprising sheath-core fibers where the sheath material comprises a polyolefin material, e.g., PET fibers, aramid fibers or glass fibers with a sheath material of polyethylene, polypropylene or combinations thereof. Each of the prepregs or cores 710, 730 may be the same or may be different. In some instances, the thermoplastic materials and lofting agent of the cores 710, 730 are the same, but the loading or type of fibers in the cores 710, 730 is different. In other instances, the type and/or amount of fibers in the cores 710, 730 may be the same and one or both of the thermoplastic material and/or the lofting agent may be different. If desired, one or more suitable flame retardant agents, e.g., halogenated or non-halogenated flame retardant agents may be present in one or both of the prepregs or cores 710, 730. While the thickness of the prepregs or cores 710, 730 is shown as being about the same in FIG. 7, the thickness of the prepregs or cores 710, 730 can vary. It may be desirable to build up a composite article using successive thin core layers to provide a desired overall core thickness. For example, it may be desirable to couple two or more thin core layers, e.g., having a thickness of 2 mm or less, to each other rather than using a lofted core layer of 4 mm, to facilitate production of a thicker core layer. The layer or skin 720 may comprise, for example, a film (e.g., thermoplastic film or elastomeric film), a frim, a scrim (e.g., fiber based scrim), a foil, a woven fabric, a non-woven fabric or be present as an inorganic coating, an organic coating, or a thermoset coating disposed on the prepreg or core 730. In other instances, the skin 720 may comprise a limiting oxygen index greater than about 22, as measured per ISO 4589 dated 1996. Where a thermoplastic film is present as or in the skin 720, the thermoplastic film may comprise at least one of poly(ether imide), poly(ether ketone), poly(ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present as or in the skin 720, the fiber based scrim may comprise at least one of glass fibers, aramid fibers, graphite fibers, carbon fibers, inorganic mineral fibers, metal fibers, metalized synthetic fibers, metalized inorganic fibers and thermoplastic fibers. Where a thermoset coating is present as or in the skin 720, the coating may comprise at least one of unsaturated polyesters, polyurethanes, vinyl esters, phenolics and epoxies. Where an inorganic coating is present as or in the skin 720, the inorganic coating may comprise minerals containing cations selected from Ca, Mg, Ba, Si, Zn, Ti and Al or may comprise at least one of gypsum, calcium carbonate and mortar. Where a non-woven fabric is present as or in the skin 720, the non-woven fabric may comprise a thermoplastic material, a thermal setting binder, inorganic fibers, metal fibers, metallized inorganic fibers and metallized synthetic fibers. Depending on the final configuration of the article 700, the skin 720 may be an open cell skin or a closed cell skin. While not shown, a decorative layer can be coupled to the skin 720 or to the surface layer 715 or both. As noted herein, the decorative layer may be formed, e.g., from a thermoplastic film of polyvinyl chloride, polyolefins, thermoplastic polyesters, thermoplastic elastomers, or the like. The decorative layer may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers (some of which may be fibers), organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer may also be produced using spunbond, thermal bonded, spun lace, melt-blown, wet-laid, and/or dry-laid processes. Depending on positioning of the decorative layer relative to incident sound energy, the decorative layer may comprise an open cell structure or a closed cell structure.

Figure 8:
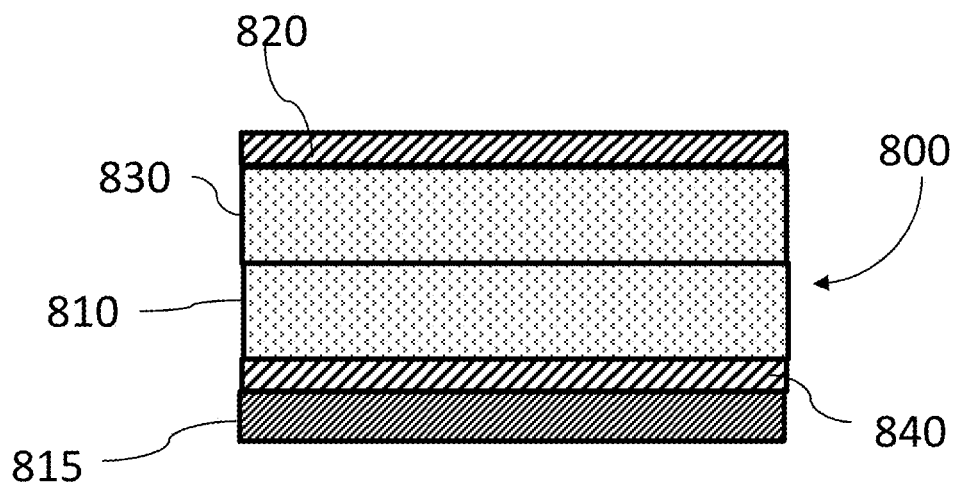
FIG. 8 is an illustration showing two prepregs or cores coupled to each other with a skin layer disposed on each of the core layers and a layer comprising sheath-core fibers which can enhance formability disposed on one of the skin layers, in accordance with certain embodiments.

In certain embodiments, two or more prepregs or cores can be coupled to each other and then a skin may be disposed on each surface of the prepregs or cores. Referring to FIG. 8, an article 800 comprising a prepreg or core 810 coupled to a prepreg or core 830, a first skin 820 disposed on the core 830, and a second skin 840 disposed on the core 810 is shown. A surface layer 815 is shown as being disposed on the skin 840. The surface layer 815 may comprise bi-component fibers, e.g., a scrim comprising sheath-core fibers, to increase the formability of the article 800, e.g., be deep drawn, during forming operations. Where sheath-core fibers are used, the exact sheath material present in the fibers of the surface layer 815 can vary and illustrative sheath materials include, but are not limited to, polyolefins such as polyethylene, polypropylene, etc. and other materials which can soften or melt to some extent during processing. In addition, the core fibers of the surface layer 815 can vary and can include, for example, one or more of glass fibers, aramid fibers, graphite fibers, carbon fibers, inorganic mineral fibers, metal fibers, metalized synthetic fibers, metalized inorganic fibers, polyethylene terephthalate fibers (PET), and thermoplastic fibers. In some instances, the surface layer 815 may comprise a fiber based scrim comprising sheath-core fibers with the sheath material comprising a polyolefin material, e.g., PET fibers, aramid fibers or glass fibers with a sheath material comprising polyethylene, polypropylene or combinations thereof. Each of the prepregs or cores 810, 830 may be the same or may be different. In some instances, the thermoplastic materials and the lofting agent of the prepregs or cores 810, 830 are the same, but the fiber loading or fiber type in the prepregs or cores 810, 830 is different. In other instances, the type and/or amount of fibers in the prepregs or cores 810, 830 may be the same and one or both of the thermoplastic material and/or the lofting agent may be different, e.g., may be chemically different or may be present in differ amounts. If desired, one or more suitable flame retardant agents, e.g., halogenated or non-halogenated flame retardant agents may be present in one or both of the prepregs or cores 810, 830. While the thickness of the prepregs or cores 810, 830 is shown as being about the same in FIG. 8, the thickness of the prepregs or cores 810, 830 can vary. As noted herein, it may be desirable to use two or more core layers coupled to each other rather than a single core layer of increased thickness. Each of the skins 820, 840 may independently comprise, for example, a film (e.g., thermoplastic film or elastomeric film), a frim, a scrim (e.g., fiber based scrim), a foil, a woven fabric, a non-woven fabric or be present as an inorganic coating, an organic coating, or a thermoset coating disposed on the prepreg or core 830. In other instances, the skins 820, 840 may independently comprise a limiting oxygen index greater than about 22, as measured per ISO 4589 dated 1996. Where a thermoplastic film is present as or in the skin 820 or the skin 840 (or both), the thermoplastic film may comprise at least one of poly(ether imide), poly(ether ketone), poly(ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present as or in the skin 820 or the skin 840 (or both), the fiber based scrim may comprise at least one of glass fibers, aramid fibers, graphite fibers, carbon fibers, inorganic mineral fibers, metal fibers, metalized synthetic fibers, metalized inorganic fibers, and thermoplastic fibers. Where a thermoset coating is present as or in the skin 820 or the skin 840 (or both), the coating may comprise at least one of unsaturated polyesters, polyurethanes, vinyl esters, phenolics and epoxies. Where an inorganic coating is present as or in the skin 820 or the skin 840 (or both), the inorganic coating may comprise minerals containing cations selected from Ca, Mg, Ba, Si, Zn, Ti and Al or may comprise at least one of gypsum, calcium carbonate and mortar. Where a non-woven fabric is present as or in the skin 820 or the skin 840 (or both), the non-woven fabric may comprise a thermoplastic material, a thermal setting binder, inorganic fibers, metal fibers, metallized inorganic fibers and metallized synthetic fibers. If desired, one of the skins 820, 840 may comprise an open cell structure and the other skin may comprise a closed cell structure. Alternatively, each of the skins 820, 840 may comprise an open cell structure or a closed cell structure. While not shown, a decorative layer can be coupled to the skin 820 or to layer 815 (or both). As noted herein, the decorative layer may be formed, e.g., from a thermoplastic film of polyvinyl chloride, polyolefins, thermoplastic polyesters, thermoplastic elastomers, or the like. The decorative layer may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers (some of which may be fibers), organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer may also be produced using spunbond, thermal bonded, spun lace, melt-blown, wet-laid, and/or dry-laid processes.

Figure 9:
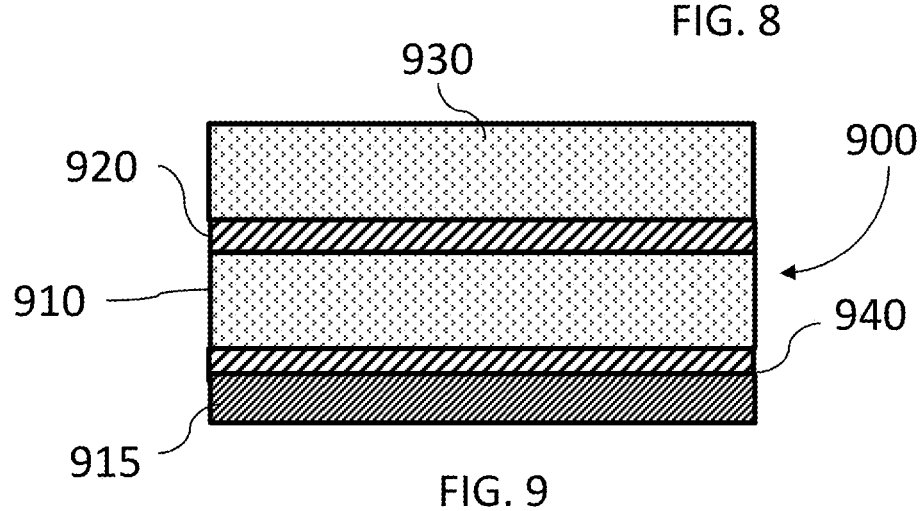
FIG. 9 is an illustration showing two prepregs or cores coupled to each other through a skin layer and comprising another skin layer disposed on one of the core layers and another layer comprising sheath-core fibers which can enhance formability disposed on one of the skin layers, in accordance with certain examples.

In certain embodiments, two or more prepregs or cores can be coupled to each other through one or more skin layers. Referring to FIG. 9, an article 900 comprising a prepreg or core 910 coupled to a prepreg or core 930 through an intermediate layer 920, and a skin 940 disposed on a surface layer 915 comprising bi-component fibers is shown. The surface layer 915 may comprise bi-component fibers, e.g., a scrim comprising sheath-core fibers, to enhance formability of the article 900. Where sheath-core fibers are used, the exact sheath material present in the fibers of the surface layer 915 can vary and illustrative sheath materials include but are not limited to, polyolefins such as polyethylene, polypropylene, etc. and other materials which can soften or melt to some extent during processing. In addition, the core fibers of the surface layer 915 can vary and can include, for example, one or more of glass fibers, aramid fibers, graphite fibers, carbon fibers, inorganic mineral fibers, metal fibers, metalized synthetic fibers, metalized inorganic fibers, polyethylene terephthalate fibers (PET), and thermoplastic fibers. In some instances, the surface layer 915 may comprise a fiber based scrim comprising sheath-core fibers where the sheath material comprises a polyolefin material, e.g., PET fibers, aramid fibers or glass fibers with a sheath material of polyethylene, polypropylene or combinations thereof. If desired, another skin can be disposed on the prepreg or core 930. Each of the prepregs or cores 910, 930 may be the same or may be different. In some instances, the thermoplastic materials and lofting agent of the prepregs or cores 910, 930 are the same, but the fiber loading or fiber type present in the prepregs or cores 910, 930 is different. In other instances, the type and/or amount of fibers in the prepregs or cores 910, 930 may be the same and one or both of the thermoplastic material and/or the lofting agent may be different, e.g., may be chemically different or may be present in differ amounts. If desired, one or more suitable flame retardant agents, e.g., halogenated or non-halogenated flame retardant agents may be present in one or both of the prepregs or cores 910, 930. While the thickness of the prepregs or cores 910, 930 is shown as being about the same in FIG. 9, the thickness of the prepregs or cores 910, 930 can vary. For example, two thin core layers can be coupled to each other instead of using a comparably thick single core layer which has been lofted to some degree. The layer 920 and the skin 940 may independently comprise, for example, a film (e.g., thermoplastic film or elastomeric film), a frim, a scrim (e.g., fiber based scrim), a foil, a woven fabric, a non-woven fabric or be present as an inorganic coating, an organic coating, or a thermoset coating. In other instances, the layer 920 and the skin 940 may independently comprise a limiting oxygen index greater than about 22, as measured per ISO 4589 dated 1996. Where a thermoplastic film is present as or in the layer 920 or the skin 940 (or both), the thermoplastic film may comprise at least one of poly(ether imide), poly(ether ketone), poly(ether-ether ketone), poly (phenylene sulfide), poly(arylene sulfone), poly(ether sulfone), poly(amide-imide), poly(1,4-phenylene), polycarbonate, nylon, and silicone. Where a fiber based scrim is present as or in the layer 920 or the skin 940 (or both), the fiber based scrim may comprise at least one of glass fibers, aramid fibers, graphite fibers, carbon fibers, inorganic mineral fibers, metal fibers, metalized synthetic fibers, metalized inorganic fibers and thermoplastic fibers. Where a thermoset coating is present as or in the layer 920 or the skin 940 (or both), the coating may comprise at least one of unsaturated polyesters, polyurethanes, vinyl esters, phenolics and epoxies. Where an inorganic coating is present as or in the layer 920 or the skin 940 (or both), the inorganic coating may comprise minerals containing cations selected from Ca, Mg, Ba, Si, Zn, Ti and Al or may comprise at least one of gypsum, calcium carbonate and mortar. Where a non-woven fabric is present as or in the layer 920 or the skin 940 (or both), the non-woven fabric may comprise a thermoplastic material, a thermal setting binder, inorganic fibers, metal fibers, metallized inorganic fibers and metallized synthetic fibers. In some instances, the layer 920 desirably comprises an open cell structure or a closed cell structure. Similarly, skin 940 may comprise an open cell structure or a closed cell structure. While not shown, a decorative layer can be coupled to the layer 915 or the prepreg or core 930 (or both). As noted herein, the decorative layer may be formed, e.g., from a thermoplastic film of polyvinyl chloride, polyolefins, thermoplastic polyesters, thermoplastic elastomers, or the like. The decorative layer may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers (some of which may be fibers), organic fiber nonwoven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer may also be produced using spunbond, thermal bonded, spun lace, melt-blown, wet-laid, and/or dry-laid processes.

Figure 10:
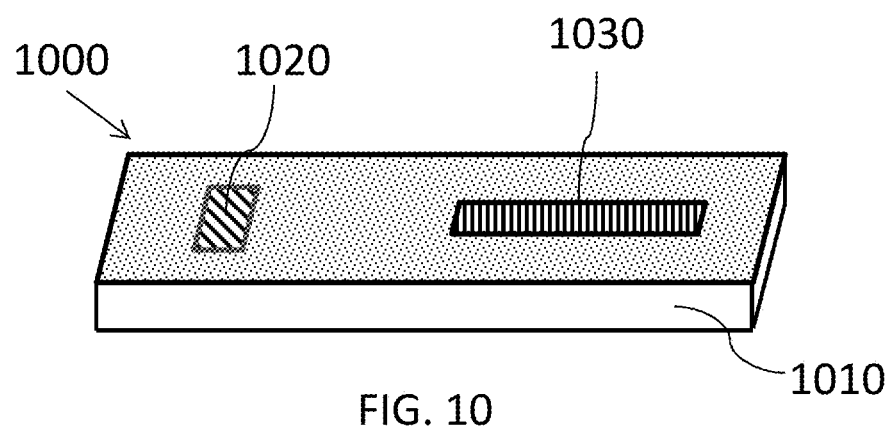
FIG. 10 is an illustration showing material strips comprising fibers which can enhance formability disposed on a core layer, in accordance with certain embodiments.

In certain embodiments, strips of material comprising bi-component fibers can be disposed on a prepreg or core layer. Referring to FIG. 10, an article 1000 comprising a prepreg or core 1010 with strips 1020, 1030 disposed on different areas of the prepreg or core 1010 is shown. If desired, such strips can be present on any of the illustrative embodiments shown in FIGS. 1-9. The strips 1020, 1030 may be the same or may be different. In some instances, one or more of the strips 1020, 1030 may comprise sheath-core fibers which can enhance formability at those areas where the strips are disposed. For example, the strips 1020, 1030 comprising the bi-component fibers can be disposed in areas which are to be subject to drawing processes to increase the overall depth in that particular area without breakthrough. If desired, the strips 1020, 1030 can be disposed on a surface layer which also comprises bi-component fibers. The prepreg or core 1010 can comprise any of the prepregs or cores described herein. The strips 1020, 1030 may comprise the same or different composition. In some examples, at least one of the strips 1020, 1030 comprises bi-component fibers, e.g., scrim strips comprising sheath-core fibers, to enhance the formability of the article 1000. Where sheath-core fibers are present in the strips, the exact sheath material present in the fibers of the strips 1020, 1030 can vary and illustrative coatings include but are not limited to, polyolefins such as polyethylene, polypropylene, etc. and other materials which can soften or melt to some extent during processing. In addition, the core fibers of the strips 1020, 1030 can vary and can include, for example, one or more of glass fibers, aramid fibers, graphite fibers, carbon fibers, inorganic mineral fibers, metal fibers, metalized synthetic fibers, metalized inorganic fibers, polyethylene terephthalate fibers (PET), and thermoplastic fibers. In some instances, the strips 1020, 1030 may comprise fiber based scrim strips comprising sheath-core fibers where the sheath material comprises a polyolefin material, e.g., PET fibers, aramid fibers or glass fibers with a sheath material comprises polyethylene, polypropylene or combinations thereof. In some instances, one of the strips 1020, 1030 comprises sheath-core fibers and the other of the strips 1020, 1030 comprises single component fibers.

In certain embodiments, any of the illustrative articles shown in FIGS. 1A and 2-10 may comprise two or more surface layers comprising bi-component fibers. For example, a first surface layer comprising bi-component fibers can be present on a first surface of a prepreg or core layer (optionally with one or more intermediate layers between the prepreg or core layer and the first surface layer on the first surface), and a second surface layer comprising bi-component fibers can be present on a second surface of a prepreg or core layer (optionally with one or more intermediate layers between the prepreg or core layer and the second surface layer on the second surface). The surface layers can have similar compositions or different compositions. In some instances, the bi-component fibers of the different surface layers comprise at least one common material, e.g., the core fibers, sheath materials or both can be the same. In other instances, the bi-component fibers of the different surface layers are the same or are substantially the same.

In some embodiments, the prepregs and cores may include additional materials or additives to impart desired physical or chemical properties. For example, one or more dyes, texturizing agents, colorants, viscosity modifiers, smoke suppressants, synergistic materials, lofting agents, particles, powders, biocidal agents, foams or other materials can be mixed with or added to the prepregs or the cores. In some instances, the prepregs or cores may comprise one or more smoke suppressant compositions in the amount of about 0.2 weight percent to about 10 weight percent. Illustrative smoke suppressant compositions include, but are not limited to, stannates, zinc borates, zinc molybdate, magnesium silicates, calcium zinc molybdate, calcium silicates, calcium hydroxides, and mixtures thereof. If desired, a synergist material can be present to enhance the physical properties of the prepregs or cores. For example, a synergist that enhances flame retardancy may be present.

In other instances, the prepregs or cores described herein may comprise a thermosetting material in a desired amount, e.g., in a minor amount less than about 50 weight percent based on the total weight of the prepreg or core, to impart desired properties to the core. The thermosetting material may be mixed with the thermoplastic material or may be added as a coating on one or more surfaces of the prepregs or cores.

In certain embodiments, the prepregs or cores described herein can be configured as (or used in) a glass mat thermoplastic composite (GMT) or a light weight reinforced thermoplastic (LWRT). One such LWRT is prepared by HANWHA AZDEL, Inc. and sold under the trademark SUPERLITE® material. SUPERLITE® mat loaded with fibers can provide desirable attributed including, for example, enhanced processing capabilities. The areal density of such a GMT or LWRT can range from about 300 grams per square meter (gsm) of the GMT or LWRT to about 4000 gsm, although the areal density may be less than 300 gsm or greater than 4000 gsm depending on the specific application needs. In some embodiments, the upper density can be less than about 4000 gsm. In some examples, the overall thickness of the GMT or LWRT may be 4 mm or less, more particularly 3 mm or less, e.g., 2 mm or less or even 1 mm or less.

In producing the prepregs and cores described herein, it may be desirable to use a wet-laid process. For example, a liquid or fluid medium comprising dispersed material, e.g., thermoplastic materials, fibers and lofting agent optionally with any one or more additives described herein (e.g., flame retardant agents), may be stirred or agitated in the presence of a gas, e.g., air or other gas, and optionally a surfactant or dispersant. The dispersion may then be laid onto a support, e.g., a wire screen or other support material, to provide a substantially uniform distribution of the materials in the laid down material. To increase material dispersion and/or uniformity, the stirred dispersion may comprise one or more active agents, e.g., anionic, cationic, or non-ionic such as, for example, those sold under the name ACE liquid by Industrial Soaps Ltd., that sold as TEXOFOR® FN 15 material, by Glover Chemicals Ltd., and those sold as AMINE Fb 19 material by Float-Ore Ltd. These agents can assist in dispersal of air in the liquid dispersion and/or dispersal of the hydrophobic components. The components can be added to a mixing tank, flotation cell or other suitable devices in the presence of air to provide the dispersion. While an aqueous dispersion is desirably used, one or more non-aqueous fluids may also be present to assist in dispersion, alter the viscosity of the fluid or otherwise impart a desired physical or chemical property to the dispersion or the prepreg, core or article.

In certain instances, after the dispersion has been mixed for a sufficient period, the fluid with the suspended materials can be disposed onto a screen, moving wire or other suitable support structure to provide a web of laid down material. Suction or reduced pressure may be provided to the web to remove any liquid from laid down material to leave behind the thermoplastic material, fibers and any other materials that are present, e.g., fibers, additives, etc. The resulting web can be dried and optionally consolidated or pressed to a desired thickness prior to full curing to provide a desired prepreg, core or article. In some instances, additional materials can be added to the web prior to drying, fully curing and/or consolidation or pressing to provide a desired prepreg, core or article. In other instances, additional materials may be added to the web subsequent to drying, curing, etc. to provide a desired prepreg, core or article. While wet laid processes may be used, depending on the nature of the thermoplastic material, the fibers and other materials present, it may be desirable to instead use an air laid process, a dry blend process, a carding and needle process, or other known process that are employed for making non-woven products. In some instances, additional fibers, lofting agent or thermoplastic material can be sprayed onto the surface of the prepreg or core after the prepreg or core has hardened to some degree by passing the board underneath a plurality of coating jets that are configured to spray the material at about a ninety degree angle to the prepreg or core surface.

In some configurations, the prepregs and cores described herein can be produced by combining a thermoplastic material, reinforcing fibers, and a lofting agent in the presence of a surfactant in an aqueous solution or foam. The combined components can be mixed or agitated for a sufficient time to disperse the various materials and provide a substantially homogeneous aqueous mixture of the materials. In addition, the materials may remain resident in the dispersion for a sufficient period to permit the fibers to react with or otherwise associate with the masking agent or sizing agent present in the dispersion to reduce the overall hydrophilicity of the reinforcing fibers. The dispersed mixture is then laid down on any suitable support structure, for example, a wire mesh or other mesh or support having a desired porosity. Water can then be evacuated through the wire mesh forming a web. The web is dried and heated above the softening temperature of the thermoplastic powder. The web is then cooled and pressed to a predetermined thickness to produce a composite sheet. In an alternate embodiment, the aqueous foam also includes a binder material.

In certain examples, a prepreg or core in the form similar to a porous GMT can be produced. In certain instances, the GMT-like core can be generally prepared using chopped fibers, a thermoplastic material, lofting agent and an optional thermoplastic polymer film or films and/or woven or non-woven fabrics made with fibers or thermoplastic resin fibers such as, for example, polypropylene (PP), polybutylene terephthalate (PBT), polyethylene terephthalate (PET), polycarbonate (PC), a blend of PC/PBT, or a blend of PC/PET. In some embodiments, a PP, a PBT, a PET, a PC/PET blend or a PC/PBT blend are can be used as the high melt flow index resin. To produce the glass mat, a thermoplastic material, reinforcing materials, and lofting agent and/or other additives can be added or metered into a dispersing foam contained in an open top mixing tank fitted with an impeller. Without wishing to be bound by any particular theory, the presence of trapped pockets of air of the foam can assist in dispersing the fibers, the thermoplastic material and the lofting agent. In some examples, the dispersed mixture of fibers and resin can be pumped to a head-box located above a wire section of a paper machine via a distribution manifold. The foam, not the fibers or thermoplastic, can then be removed as the dispersed mixture is provided to a moving wire screen using a vacuum, continuously producing a uniform, fibrous wet web. The wet web can be passed through a dryer at a suitable temperature to reduce moisture content and to melt or soften the thermoplastic material. When the hot web exits the dryer, a surface layer such as, for example, a film may be laminated onto the web by passing the web of fibers and thermoplastic material and the film through the nip of a set of heated rollers. If desired, additional layers such as, for example, a non-woven and/or woven fabric layer may also be attached along with the film to one side or to both sides of the web to facilitate ease of handling the glass fiber-reinforced mat. The composite can then be passed through tension rolls and continuously cut (guillotined) into the desired size for later forming into an end product article. Further information concerning the preparation of GMT composites, including suitable materials and processing conditions used in forming such composites, are described, for example, in U.S. Pat. Nos. 6,923,494, 4,978,489, 4,944,843, 4,964,935, 4,734,321, 5,053,449, 4,925,615, 5,609,966 and U.S. Patent Application Publication Nos. US 2005/0082881, US2005/0228108, US 2005/0217932, US 2005/0215698, US 2005/0164023, and US 2005/0161865.

Figure 11:
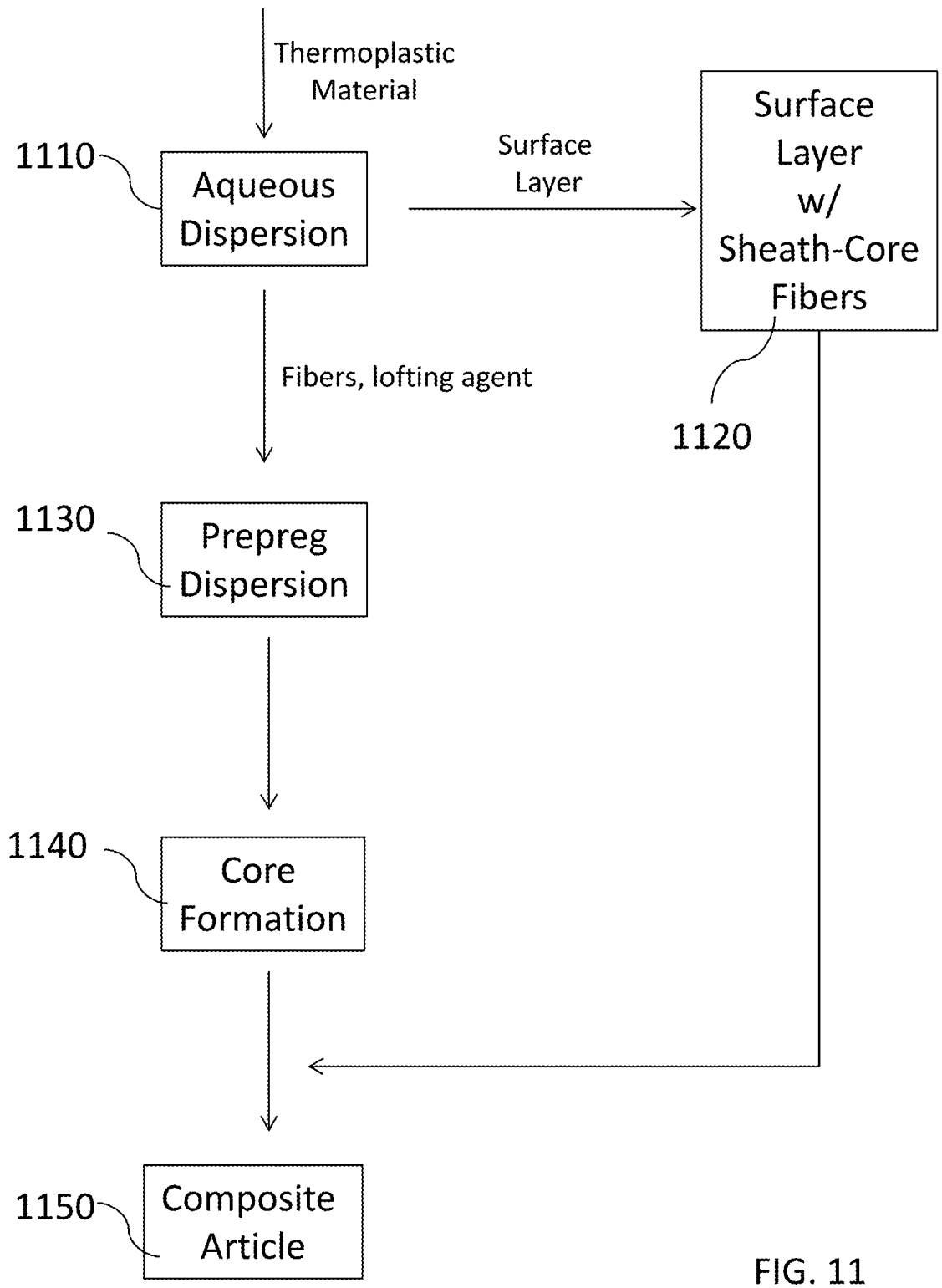
FIG. 11 is a schematic of a method for preparing an article described herein, in accordance with certain embodiments.

In some examples, a dispersion of the thermoplastic material can be used to provide a coating onto a surface layer to be coupled to a resulting prepreg or core which is formed, in part, using the thermoplastic material. One illustration of certain process steps is shown in FIG. 11. In a step 1110, a thermoplastic material is provided to a mixing tank to provide an aqueous dispersion of the thermoplastic materials. Dispersants, surfactants, etc. can be added to the mixing tank, or the mixing tank may comprise a dispersion or solution of the thermoplastic material in an aqueous solvent or carrier without the use of any dispersants or surfactants. The dispersion can be provided to a surface layer comprising core fibers at a step 1120 to dispose a sheath material onto the fibers with the dispersed thermoplastic material and provide a coated surface layer at step 1130. For example, the dispersion can be sprayed on the core fibers of the surface layer, the core fibers of the surface layer can be dipped in the dispersion or the dispersion may otherwise be provided to the core fibers of the surface layer in some manner to provide a sheath material such that at least about 75% of the fibers present in the surface layer, e.g., least 80%, 85%, 90% or 95% of the fibers present in the surface layer, comprise a sheath material. A prepreg dispersion can be formed at a step 1130 by adding reinforcing fibers, an optional lofting agent and other additives to the aqueous dispersion comprising the thermoplastic material. The prepreg dispersion can be used to form a core at a step 1140 using various processes such as wet laid processes, air laid processes, etc. The coated surface layer from step 1120 can then be disposed onto the formed core to provide (at step 1150) a composite article comprising a porous core formed from the thermoplastic material and the reinforcing fibers (and optionally the lofting agent) with a surface layer comprising coated fibers to enhance elongation of the formed article and permit forming operations with the formed article without breakthrough in deep drawn areas.

Figure 12:
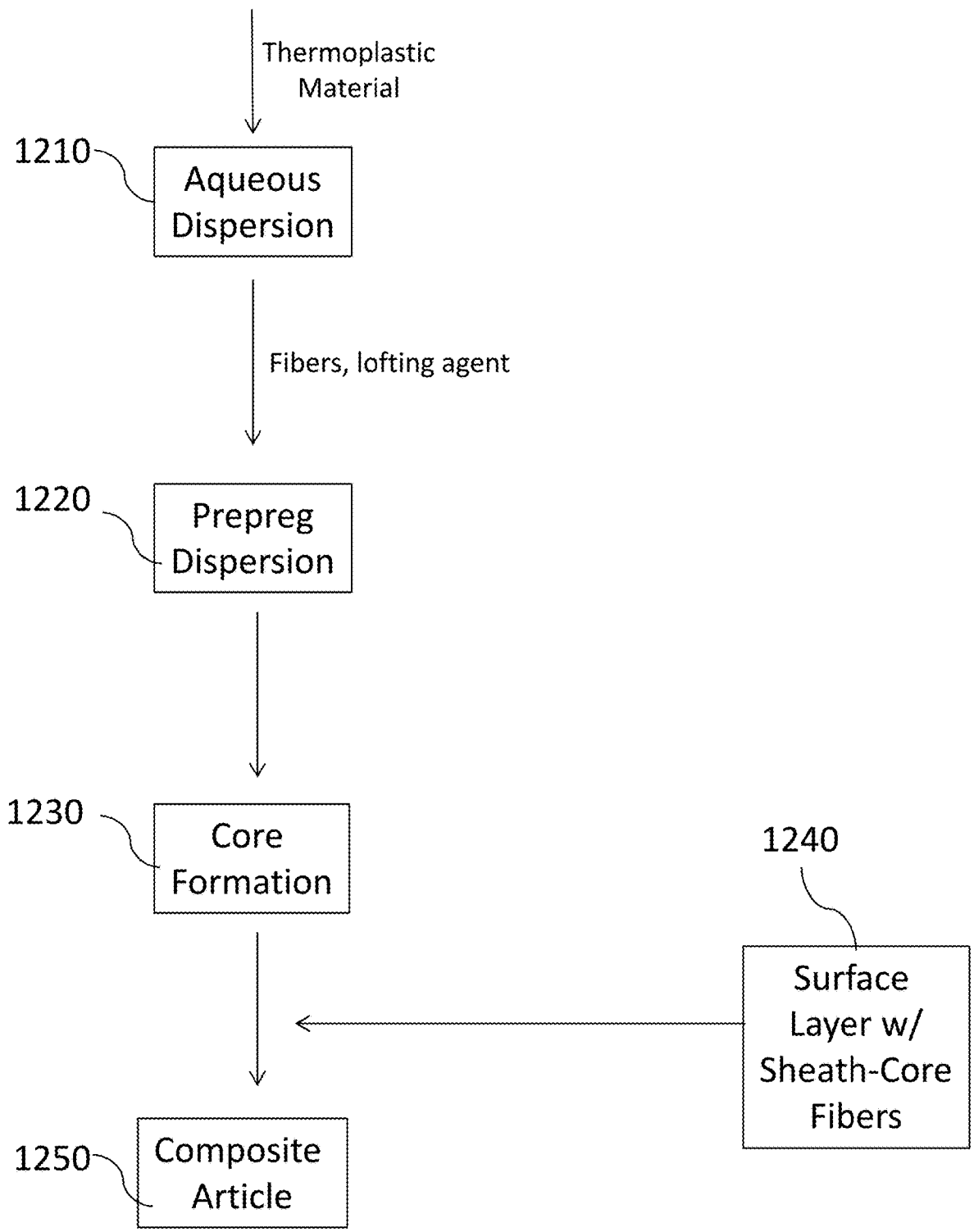
FIG. 12 is a schematic of another method for preparing an article described herein, in accordance with certain embodiments.

In other instances, a process similar to that in FIG. 11 can be used but the surface layer comprising the sheath-core fibers may be pre-formed and added to the formed core. For example, sheath materials and core fiber materials can be co-extruded to provide sheath-core fibers which can be formed into a surface layer such as, for example, a non-woven scrim. Referring to FIG. 12, a thermoplastic material is provided to a mixing tank to provide an aqueous dispersion of the thermoplastic materials at a step 1210. Dispersants, surfactants, etc. can be added to the mixing tank, or the mixing tank may comprise a dispersion or solution of the thermoplastic material in an aqueous solvent or carrier without the use of any dispersants or surfactants. A prepreg dispersion can be formed at a step 1220 by adding reinforcing fibers, an optional lofting agent and other additives to the aqueous dispersion comprising the thermoplastic material. The prepreg dispersion can be used to form a core at a step 1230 using various processes such as wet laid processes, air laid processes, etc. The pre-formed coated surface layer can be coupled to the formed core at a step 1240 to provide (at step 1250) a composite article comprising a porous core formed from the thermoplastic material and the reinforcing fibers (and optionally the lofting agent) with a surface layer comprising sheath-core fibers to enhance elongation of the formed article and permit forming operations with the formed article without breakthrough in deep drawn areas.

Figure 13:
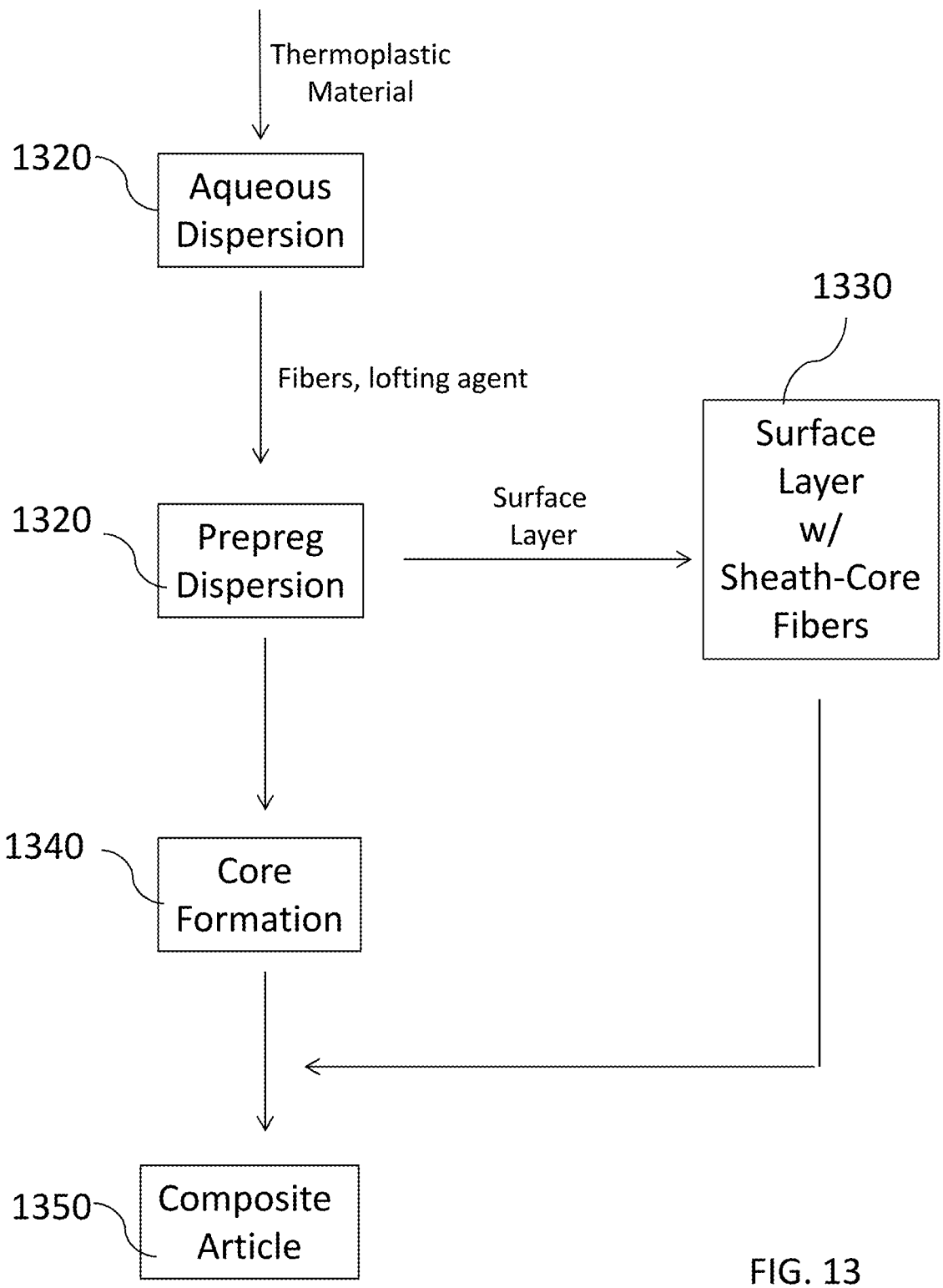
FIG. 13 is a schematic of another method for preparing an article described herein, in accordance with certain embodiments.

In some examples, the core fibers of the surface layer can be coated with the prepreg dispersion. Referring to FIG. 13, a thermoplastic material is provided to a mixing tank to provide an aqueous dispersion of the thermoplastic materials at a step 1310. Dispersants, surfactants, etc. can be added to the mixing tank, or the mixing tank may comprise a dispersion or solution of the thermoplastic material in an aqueous solvent or carrier without the use of any dispersants or surfactants. A prepreg dispersion can be formed at a step 1320 by adding reinforcing fibers, an optional lofting agent and other additives to the aqueous dispersion comprising the thermoplastic material. The prepreg dispersion can be provided to a surface layer comprising core fibers at a step 1330 to dispose the prepreg dispersion into the core fibers. For example, the prepreg dispersion can be sprayed on the core fibers of the surface layer, the core fibers of the surface layer can be dipped in the prepreg dispersion or the prepreg dispersion may otherwise be provided to the core fibers of the surface layer in some manner to dispose the prepreg dispersion onto the core fibers, e.g., at least about 75%, 80%, 85%, 90% or 95% of the core fibers present in the surface layer may comprise the disposed prepreg dispersion. In some examples, after providing the prepreg dispersion to the core fibers of the surface layer, the surface layer can be heated to melt the thermoplastic material present on the core fibers of the surface layer. The surface layer can be cooled, and the reinforcing fibers and lofting agent can be washed away after the surface layer cools leaving behind the thermoplastic material disposed on the core fibers. The prepreg dispersion can also be used to form a core at a step 1340 using various processes such as wet laid processes, air laid processes, etc. The formed surface layer can be coupled to the formed core to provide (at step 1350) a composite article comprising a porous core formed from the thermoplastic material and the reinforcing fibers (and optionally the lofting agent) with a surface layer comprising sheath-core fibers to enhance elongation of the formed article and permit forming operations with the formed article without breakthrough in deep drawn areas.

In some embodiments, a core can be formed on a surface layer by spraying, coating or otherwise disposing the core components onto the surface layer. The surface layer can be pre-formed with sheath-core fibers or the sheath-core fibers can be formed using one or more materials during the production process. In some examples, the thermoplastic material and reinforcing fiber dispersion (and optionally any lofting agent) can be sprayed onto the surface layer comprising sheath-core fibers to form the prepreg on top of the surface layer. The prepreg and surface layer composite can be further processed by heating, compressing, dicing, cutting, etc. to provide an article with a desired thickness and/or shape. The formed article can then be subjected to one or more forming processes such as molding, deep drawing and the like.

In certain examples, the articles described herein may comprise an adhesive layer between the core layer and one or more other layers if desired. For example, in certain automotive applications it may be desirable to staple, glue or otherwise attach a fabric or covering to the article to provide for a more aesthetically pleasing article, e.g., to provide an aesthetically pleasing headliner or other interior automotive component such as, for example, luggage side trim, a vehicle headliner, trunk trim, pillar trim, or a compartment cover. In other instances, the articles described herein can be used in building applications including, but not limited to, wall coverings, ceiling panels, cubicle dividers or other similar products.

In other instances, the articles described herein can be configured as an exterior automotive part including, but not limited to, a wheel well liner, an underbody shield, a spare tire cover or other automotive components that are coupled to a vehicle and remain outside of a passenger compartment. In some examples, the articles described herein may be configured as an interior automotive part including, but not limited to, a headliner, a trunk trim panel, a seat back panel, a floor board liner or other interior automotive parts.

In other configurations, the composite articles described herein can be used in building applications such as tile, ceiling panels, cubicle walls, roofing materials, wallboards and other applications particularly those where it may be desirable to have three-dimensional structural panels or three-dimensional aesthetic or covering panels. The ability to deeply draw the composite article described herein permits construction of shapes and features not typically achievable with conventional building panels.

In additional configurations, the composite articles described herein can be used in interior recreational vehicle (RV) applications such as wall coverings, table coverings, floor coverings, cabinetry, ceiling tiles or ceiling panels, countertops or other interior RV applications.

Certain examples are described below to illustrate better some of the novel aspects and configurations described herein. In the specific examples, the ability of various scrims and articles comprising the scrims to elongate is tested.

Examples 1-9

Various different scrims were tested (prior to being coupled to any core layer) to determine whether they would be suitable for use in the composite articles described herein to enhance formability. The scrims are listed below in Table 1

TABLE 1

| Example | Scrim Type | Basis Weight (gsm) |
|---|---|---|
| 1 | nylon scrim | 17 |
| 2 | nylon scrim | 10 |
| 3 | PET scrim | 17 |
| 4 | PE/nylon/PET scrim | 62 |
| 5 | PET scrim | 30.5 |
| 6 | PET scrim | 50 |
| 7 | nylon scrim | 24 |
| 8 | PE- PET sheath-core fiber (white) | 20 |
| 9 | PE- PET sheath-core fiber (black) | 20 |

Elongation measurements of the articles of Examples 1-9 at room temperature (RT) were performed. Table 2 shows the results of the elongation measurements in the machine direction (MD) and the cross direction (CD). The measurements were performed according to the ASTM 5304-09 (2013) test entitled "Breaking Strength and Elongation of Textile Fabrics Grab Test" using a testing system from MTS Systems Corporation.

TABLE 2

| | Elongation at MD (%) | | Elongation at MD (%) | |
|---|---|---|---|---|
| Example | Average | STDEV | Average | STDEV |
| 1 | 58 | 5.3 | 46.3 | 6.4 |
| 2 | 50.2 | 6.1 | 46.1 | 10.8 |
| 3 | 36 | 14 | 46.9 | 2.5 |
| 4 | 37.9 | 11 | 42 | 16.4 |
| 5 | 12.3 | 0.8 | 23.5 | 5.7 |
| 6 | 65 | 8.1 | 98.6 | 5 |
| 7 | 47.6 | 3.6 | 45.8 | 7.4 |
| 8 | 50.0 | 11.6 | 62.3 | 11.8 |
| 9 | 57.7 | 10.8 | 61.5 | 9.7 |

The scrims of Examples 8 and 9 provided high elongation in both the machine direction and the cross direction. In particular, elongation of 50% of more in both the machine direction and the cross direction were achieved with the scrims of Example 8 and 9.

Example 10

Elongation measurements of the surface layer materials tested in Examples 1-9 at 200 deg. Celsius were performed. Table 3 shows the results of the elongation measurements in the machine direction (MD) and the cross direction (CD). The measurements were performed according to the ASTM 5304-09(2013) test entitled "Breaking Strength and Elongation of Textile Fabrics Grab Test" using a testing system from MTS Systems Corporation.

TABLE 3

| | Elongation at MD (%) | | Elongation at CD (%) | |
|---|---|---|---|---|
| Example | Average | STDEV | Average | STDEV |
| 1 | 59.9 | 18 | 67.5 | 2.1 |
| 2 | 61.5 | 3.9 | 55.5 | 3.7 |
| 3 | 63.2 | 4.6 | 72.2 | 10.3 |
| 4 | 80 | 9.9 | 82.8 | 14.3 |
| 5 | 6.4 | 1.6 | 3.2 | 3.7 |
| 6 | 83.2 | 5.7 | 78.7 | 16.4 |
| 7 | 77.2 | 5.7 | 57.9 | 3.6 |
| 8 | >101.2 | | >99.4 | |
| 9 | >102.5 | | >104.3 | |

At 200 deg. Celsius, the scrims with the sheath-core fibers (Examples 8 and 9) displayed the highest elongation in both the machine and cross directions. The elongation values were likely even higher for Example 8 and 9 since the scrims were not broken at the chamber limits.

Example 11

Figure 14:
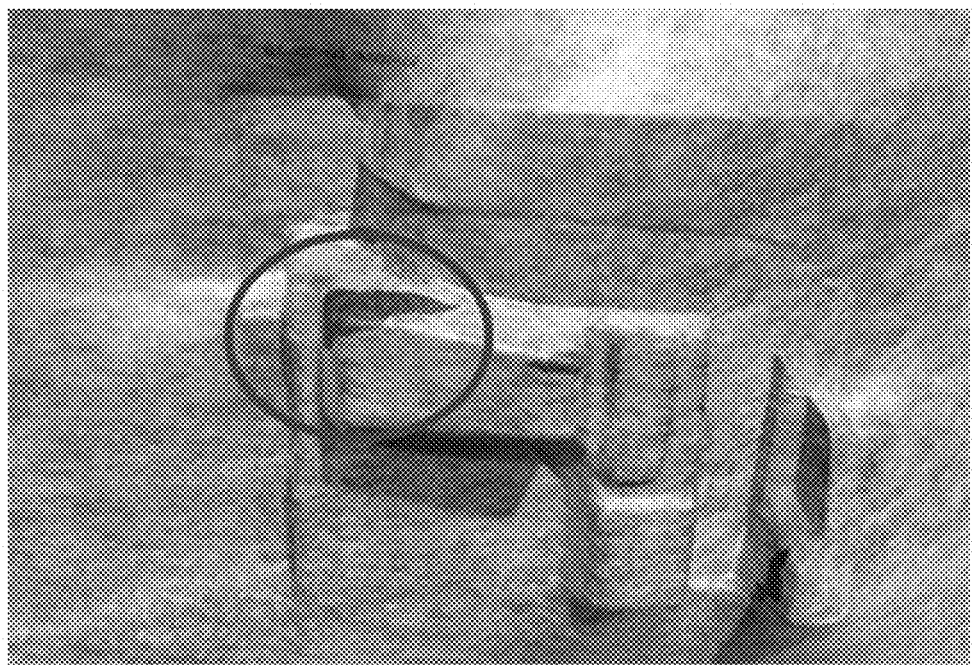
FIG. 14 is a photograph of a test sample after being subjected to a deep draw process showing tearing in deep drawn areas, in accordance with certain examples.
Figure 15:
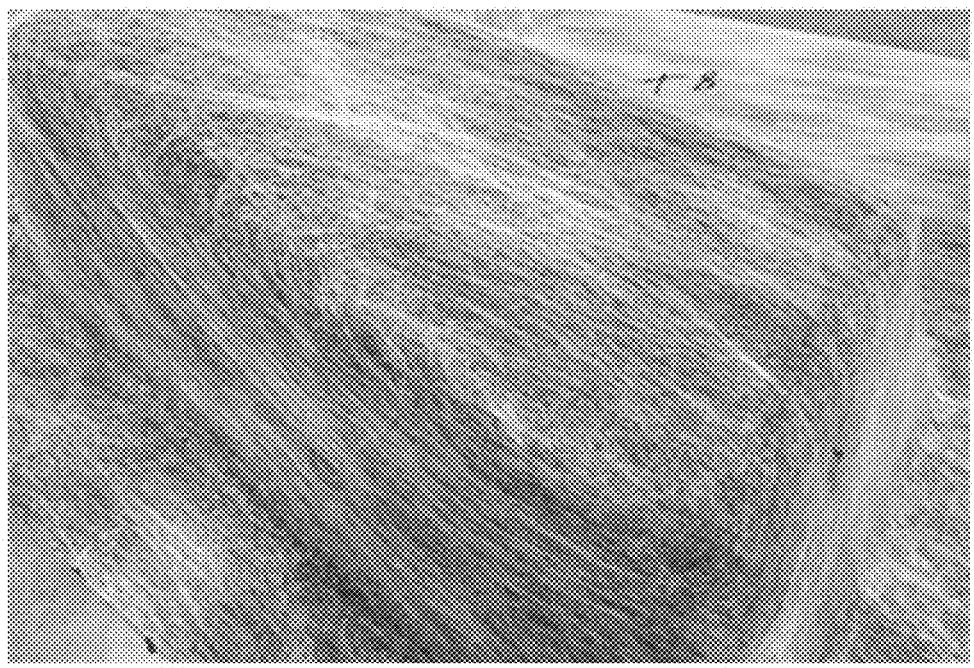
FIG. 15 is a photograph of a test sample after being subjected to a deep draw process showing no tearing or wrinkling, in accordance with certain examples.

Certain articles were subjected to a deep draw molding process. Photographs showing the formed parts are shown in FIGS. 14 (nylon scrim) and 15 (polyethylene (PE) sheath material and PET core fiber scrim). At a fixed draw depth and geometry, tearing was observed when the article including the nylon scrim was deep drawn. At the same fixed draw depth and geometry, no tearing was observed when the polyethylene (PE)-PET sheath core fiber scrim was molded (FIG. 15). No wrinkling was observed on any of the molded sample, so high shrinkage did not cause any issues during molding.

Example 12

The physical values of three LWRT boards were measured including a control board (PET scrim), Sample A (PE-PET sheath core fiber) and Sample B (PE-PET sheath core fiber). The values are shown in Table 4 below.

TABLE 4

| Sample | Core area Density (g/m²) | Sheet area Density (g/m²) | Density (g/cm³) | Thickness (mm) | Ash (%) | Scrim |
|---|---|---|---|---|---|---|
| Control | 607 | 722 | 0.30 | 2.37 | 46.8 | PET scrim 17 gsm |
| Sample A | 596 | 714 | 0.32 | 2.26 | 45.5 | PE-PET sheath-core fiber scrim 20 gsm |
| Sample B | 517 | 635 | 0.31 | 2.02 | 45.9 | PE- PET sheath-core fiber scrim 20 gsm |

Each of the Control, Sample A and Sample B boards were subjected to a deep draw process and ranked. The rankings are shown below in Table 5 for each tested board. The ranking numbers correspond to the following criteria: Rank 1: Cups are not fully formed; Rank 2: Cups are fully formed with holes through the core; Rank 3: Cups are fully formed with soft spots or loss of structure integrity; Rank 4: Cups are fully formed and maintain structure integrity; and Rank 5: Cups are fully formed with no scrim tear and maintaining structure integrity. Each rank was an average ranking of three (3) molded parts.

TABLE 5

| Sample | Rank at 15 mm cavity | Rank at 30 mm cavity |
|---|---|---|
| Control | 5 | 3.7 |
| Sample A | 5 | 5 |
| Sample B | 5 | 5 |

Example 13

Control and sample articles were used to form "cupcake" or truncated cone shapes at various sites and depth. The die included five areas of different depths with site 1 corresponding to a depth of 15 mm, site 2 corresponding to a depth of 30 mm, site 3 corresponding to a depth of 45 mm, and sites 4 and 5 corresponding to a depth of 50 mm. The die cavity opening or span dimension was 36 mm for all formed areas. The calculated depth of draw ratio for each cavity site is shown in Table 6.

TABLE 6

| Cavity Site | Depth of Draw Ratio |
|---|---|
| 1 | 0.416 |
| 2 | 0.833 |
| 3 | 1.25 |
| 4 | 1.39 |
| 5 | 1.39 |

The control article was a 600 gsm LWRT article with a PET fiber non-woven scrim. Sample 1 was a 600 gsm LWRT article with a PE sheath material-PET core fiber non-woven scrim. Sample 2 was a 500 gsm LWRT article with a PE sheath material-PET core fiber non-woven scrim.

The results at cavity site 1 (15 mm depth) for each of the samples is shown below in

TABLE 7

| Sample | Observations at Cavity Site 1 |
|---|---|
| Control | Truncated cone structure formed with structural integrity and without tearing of the PET fiber non-woven scrim. |
| Sample 1 | Truncated cone structure formed with structural integrity and without tearing of the PE-PET sheath-core fiber non-woven scrim. |
| Sample 2 | Truncated cone structure formed with structural integrity and without tearing of the PE-PET sheath core fiber non-woven scrim. |

The results at cavity site 2 (30 mm depth) for each of the samples is shown below in Table 8.

TABLE 8

| Sample | Observations at Cavity Site 2 |
|---|---|
| Control | Truncated cone structure formed with structural integrity loss and with surface tearing of the PET fiber non-woven scrim. |
| Sample 1 | Truncated cone structure formed with structural integrity and without tearing of the PE-PET sheath-core fiber non-woven scrim. |
| Sample 2 | Truncated cone structure formed with structural integrity and without tearing of the PE- PET sheath-core fiber non- woven scrim. |

These results are consistent with articles comprising the bi-component fiber scrim providing larger draw depths without breakthrough.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A composite article comprising:
a thermoplastic fiber-reinforced porous core layer comprising a web formed from a plurality of reinforcing fibers and a thermoplastic material, wherein the reinforcing fibers in the thermoplastic fiber-reinforced porous core layer comprise sheath-core fibers;
a non-woven scrim coupled to the thermoplastic fiber-reinforced porous core layer at a first surface of the thermoplastic fiber-reinforced porous core layer, the non-woven scrim comprising a plurality of bi-component sheath-core fibers, wherein a sheath material of the bi-component sheath-core fibers of the non-woven scrim surrounds all sides of a core material of the sheath-core fibers, and wherein a sheath material of the sheath-core fibers in the thermoplastic fiber-reinforced porous core layer is a different sheath material than a sheath material of the bicomponent sheath-core fibers of the non-woven scrim;

a scrim without any bi-component fibers coupled to a second surface of the thermoplastic fiber-reinforced porous core layer.

2. The composite article of claim 1, in which at least 95% by weight of the fibers of the non-woven scrim are bi-component sheath-core fibers.

3. The composite article of claim 1, in which the sheath material of the sheath-core fibers of the non-woven scrim comprises a polyolefin and the core material of the sheath-core fibers of the non-woven scrim comprises a polyester.

4. The composite article of claim 3, in which the polyolefin comprises polyethylene or polypropylene or both and the polyester comprises polyethylene terephthalate.

5. The composite article of claim 1, in which the thermoplastic material of the thermoplastic fiber-reinforced porous core layer comprises one or more of polyethylene, polypropylene, polystyrene, acrylonitrylstyrene, butadiene, polyethyleneterephthalate, polybutyleneterephthalate, polybutylenetetrachlorate, polyvinyl chloride, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, a poly(1,4 phenylene) compound, a high heat polycarbonate, high temperature nylon, silicones, or blends of these materials with each other.

6. The composite article of claim 1, further comprising additional reinforcing fibers in the thermoplastic fiber-reinforced porous core layer, in which the additional reinforcing fibers of the thermoplastic fiber-reinforced porous core layer comprise one or more of glass fibers, aramid fibers, graphite fibers, carbon fibers, inorganic mineral fibers, metal fibers, metalized synthetic fibers, and metallized inorganic fibers, fibers or combinations thereof.

7. The composite article of claim 1, in which the porous core further comprises a lofting agent.

8. The composite article of claim 1, in which a porosity of the thermoplastic fiber-reinforced porous core layer is at least 20%.

9. The composite article of claim 8, in which the thermoplastic material in the thermoplastic fiber-reinforced porous core layer is present from about 20 weight percent to about 80 weight percent based on the weight of the thermoplastic fiber-reinforced porous core layer, and the reinforcing fibers in the thermoplastic fiber-reinforced porous core layer are present from about 20 weight percent to about 80 weight percent based on the weight of the thermoplastic fiber-reinforced porous core layer.

10. The composite article of claim 9, in which the thermoplastic material comprises a polyolefin, and the reinforcing fibers comprise glass fibers.

11. The composite article of claim 10, in which the article comprises at least one deep drawn area with a depth of draw ratio of at least 0.25 without breakthrough at the least one deep drawn area.

12. The composite article of claim 10, in which the article comprises at least one deep drawn area with a depth of draw ratio of at least 0.8 without breakthrough at the least one deep drawn area.

13. The composite article of claim 10, in which the article comprises at least one deep drawn area with a depth of draw ratio of at least 1.0 without breakthrough at the least one deep drawn area.

14. The composite article of claim 10, in which the article comprises at least one deep drawn area with a depth of draw ratio of at least 1.25 without breakthrough at the least one deep drawn area.

15. The composite article of claim 1, in which a basis weight of the non-woven scrim is 10 gsm to 300 gsm.

16. The composite article of claim 1, further comprising a decorative layer coupled to the composite article.

17. The composite article of claim 1, in which the thermoplastic fiber-reinforced porous core layer comprises a basis weight of about 300 gsm to about 3500 gsm.

* * * * *